(12) United States Patent
Okano

(10) Patent No.: US 8,339,408 B2
(45) Date of Patent: Dec. 25, 2012

(54) CONTENTS RECEIVING APPARATUS

(75) Inventor: Michiaki Okano, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1054 days.

(21) Appl. No.: 12/327,052

(22) Filed: Dec. 3, 2008

(65) Prior Publication Data

US 2009/0244087 A1 Oct. 1, 2009

(30) Foreign Application Priority Data

Mar. 31, 2008 (JP) ................ P2008-093940

(51) Int. Cl.
*G06T 15/60* (2006.01)
*G06T 1/00* (2006.01)
*G09G 5/00* (2006.01)
*G09G 5/10* (2006.01)
*H04N 5/57* (2006.01)
*G03F 3/08* (2006.01)
*G06K 9/40* (2006.01)
*G06F 15/16* (2006.01)
*G06T 17/00* (2006.01)

(52) U.S. Cl. ........ 345/581; 345/426; 345/428; 345/204; 345/522; 345/691; 348/687; 358/520; 382/254; 382/274; 709/200; 709/233

(58) Field of Classification Search ............... 345/418, 345/426, 428, 581, 618–619, 207, 204, 522, 345/690–691, 211–213, 63, 76–77; 348/489, 348/500, 671–673, 687, 712; 358/3.24, 509, 358/520, 525; 382/254, 274; 709/200, 217, 709/230–233

See application file for complete search history.

(56) References Cited

U.S. PATENT DOCUMENTS

| 2004/0145660 A1* | 7/2004 | Kusaka ............... 348/211.2 |
| 2006/0007206 A1* | 1/2006 | Reddy et al. ........... 345/204 |
| 2006/0007249 A1* | 1/2006 | Reddy et al. ........... 345/690 |
| 2006/0279523 A1* | 12/2006 | Nitta et al. ............ 345/102 |
| 2007/0188429 A1* | 8/2007 | Yamaguchi et al. ...... 345/88 |
| 2008/0068486 A1* | 3/2008 | Kusaka ............... 348/333.02 |
| 2009/0167791 A1* | 7/2009 | Shiomi ............... 345/691 |

FOREIGN PATENT DOCUMENTS

JP 2002-261922 A 9/2002

\* cited by examiner

*Primary Examiner* — Wesner Sajous

(74) *Attorney, Agent, or Firm* — Maschoff Gilmore & Israelsen

(57) ABSTRACT

According to one embodiment of the invention, a contents receiving apparatus includes: a communication unit configured to receive contents data; a display unit configured to display an image included in the contents data; and a controller configured to instruct the communication unit to receive contents data, and to control the display unit to display the image, wherein, when estimated time of completion for receiving the contents data is longer than a given time, the controller controls the display unit to change a luminance level of the display unit from a first luminance level to a second luminance level that is lower than the first luminance level or not to display the contents, and wherein, when the estimated time is equal to or shorter than the given time, the controller controls the display unit to maintain the luminance level at the first luminance level.

15 Claims, 13 Drawing Sheets

FIG.4

12f MOBILE COMMUNICATION ERROR RATE-SPEED ASSOCIATION

| BEARER \ ERROR RATE | FIRST ERROR RATE (12h-1) | SECOND ERROR RATE (12h-2) | THIRD ERROR RATE (12h-3) | FOURTH ERROR RATE (12h-4) |
|---|---|---|---|---|
| FIRST BEARER (12g-1) | X11 bps | X12 bps | X13 bps | X14 bps |
| SECOND BEARER (12g-2) | X21 bps | X22 bps | X23 bps | X24 bps |
| THIRD BEARER (12g-3) | X31 bps | X32 bps | X33 bps | X34 bps |
| FOURTH BEARER (12g-4) | X41 bps | X42 bps | X43 bps | X44 bps |

21c PROJECTION BEFORE CONTENTS DOWNLOAD
INSTRUCTION AND DURING CONTENTS DOWNLOAD

CONTENTS RECEIVING APPARATUS

CROSS-REFERENCE TO RELATED APPLICATIONS

This application is based upon and claims the benefit of priority from Japanese Patent Application No. 2008-093940, filed Mar. 31, 2008, the entire contents of which are incorporated herein by reference.

BACKGROUND

1. Field

The present invention relates to a contents receiving apparatus, and in particular, to a processing for displaying received contents.

2. Description of the Related Art a contents receiving apparatus displays images on a display section, having a display screen, on which a user views images, and externally displays images by an image output section such that a person other than the user can view the images, regardless of whether or not the user can view the images, or the number of persons. An example of external display by the image output section is projection by a projector. The projector projects images on a screen or a wall other than the apparatus. For the projector, any light source may be used.

Another example of external display by the image output section is display by a large display section, for example, a liquid crystal display or a cathode-ray tube. The image output section may be incorporated into a housing of the apparatus or may be detachably mounted in the apparatus. The image output section may be connected to the apparatus in a wired or wireless manner. In transferring the images to the image output section in a wired or wireless manner, any protocol may be used.

The images include all the contents to be externally displayed. For example, still images or motion images may be used. The images may be images including only character strings. Image display includes reproduction display of stored images.

External display is used when the user (presenter) makes a presentation. External display is also used when the user views images. This is because, in the case of external display, images are displayed on a large scale, as compared with display on the display section, and thus images can be easily viewed. External display and display on the display section may be identical or different according to the user's intention, regardless of whether or not a person who views images to be externally displayed is the user or a person other than the user.

Images to be displayed are not limited to images stored in the apparatus, regardless of external display or display on the display section. That is, after the user sets display to be performed according to his/her intention, an image may be received by a communication section, and the received image may be displayed. A motion image, which is being received by the communication section, may be displayed. Display of a motion image being received is called streaming reproduction.

After an instruction to receive an image is input until the image can be displayed, it takes a time to receive the image. The same is applied to streaming reproduction. If a part of a motion image is received, and an unreceived portion of the motion image is predicted to be received after the received portion of the motion image is reproduced, it is determined that streaming reproduction can be started. That is, after an instruction to receive a motion image is input until display of the motion image by streaming reproduction starts, it takes a time to receive a part of the motion image.

A processing is known that, in order to reduce power consumption for display, disables display after an instruction to receive an image is input until the image can be displayed (for example, see JP-A-2002-261922 (p. 1 and FIG. 2)).

According to the method disclosed in JP-A-2002-261922, display is not performed after an instruction to receive an image is input until the image can be displayed, regardless of the amount of time. Accordingly, display is stopped even for a short time. Due to display stoppage for a short time, for example, several seconds, a person who views display feels a sense of discomfort. The same is applied to a change in brightness, in addition to display stoppage.

In any light source for the display section or the image output section, it takes a predetermined time to start display after display is stopped, or until high-luminance display is performed. In addition, power consumption is increased when display starts, as compared with when display is being performed. When display starts frequently, the lifetime of the light source may be shortened. For this reason, display stoppage for 10 minutes or less is not desirable. This disadvantage depending to the light source severely appears in an electric-discharge lamp, such as a mercury lamp.

SUMMARY OF THE INVENTION

According to an aspect of the present invention, there is provided a contents receiving apparatus including: a communication unit configured to receive contents data; a display unit configured to display an image included in the contents data; and a controller configured to instruct the communication unit to receive contents data, and to control the display unit to display the image, wherein, when estimated time of completion for receiving the contents data is longer than a given time, the controller controls the display unit to change a luminance level of the display unit from a first luminance level to a second luminance level that is lower than the first luminance level or not to display the contents, and wherein, when the estimated time is equal to or shorter than the given time, the controller controls the display unit to maintain the luminance level at the first luminance level.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary diagram showing an example of mobile communication error rate-speed association according to an embodiment of the invention.

DETAILED DESCRIPTION

Figure 1:
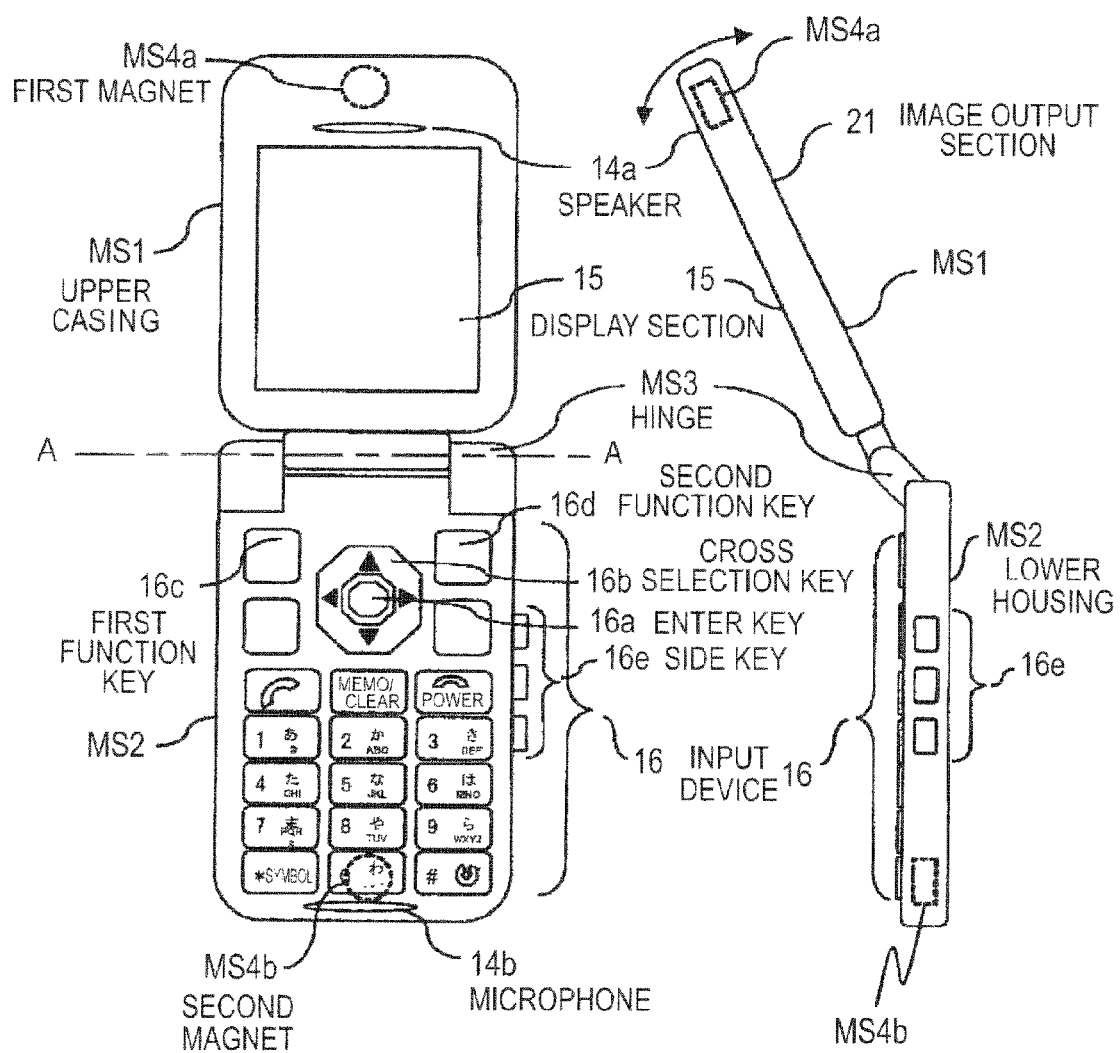
FIGS. 1A and 1B are exemplary exterior views of a foldable mobile communication terminal according to an embodiment of the invention in a state where upper and lower housings are opened.

An embodiment of a contents receiving apparatus according to the invention will now be described with reference to the drawings. FIGS. 1A and 1B show the exterior structure of a foldable mobile communication terminal, which is an example of a contents receiving apparatus according to an embodiment of the invention, in a state where upper and lower housing are unfolded. FIG. 1A is a front view, that is, a top view, and FIG. 1B is a side view.

The mobile communication terminal has an upper housing MS1 and a lower housing MS2, which are connected to each other by a hinge MS3 to be rotatable around an axis A-A. The upper and lower housings MS1 and MS2 are opened/closed in a range of approximately 0 degree (closed state) to 180 degrees (open state). Provided on an inner surface of the upper housing MS1 are a speaker 14a that is used for an incoming speech, and a display section 15 that is formed by an LCD (Liquid Crystal Display) with a backlight and used for display to urge a user's operation, display of the content according to the user's operation, or display of a cursor position or an operation state of the terminal. An image output section 21 is provided on an outer surface of the upper housing MS1. The image output section 21 is formed by a projector, which has a light-emitting diode as a light source and projects an image outside of the terminal.

A microphone 14b, which is used for an outgoing speech, is provided on an inner surface of the lower housing MS2. An input device 16, which is formed by a keypad, is provided on an inner surface and a side surface of the lower housing MS2. An antenna, which is used to transmit/receive an electric wave, is provided in the lower housing MS2.

The input device 16 includes, on the inner surface of the lower housing MS2, an enter key 16a that is used to instruct decision or selection of each function, four keys that are provided around the enter key 16a to surround the enter key 16a and individually disposed on the up, down, left, and right sides of the enter key 16a, and a cross selection key 16b that is used to instruct movement of a cursor position on the display section 15. A first function key 16c and a second function key 16d are provided on the inner surface of the lower housing MS2 near the display section 15, that is, on the left and right sides near the upper housing MS1. The first function key 16c and the second function key 16d are used to select first and second functions displayed on the left and right sides at a lower part of the display section 15, respectively.

The input device 16 further includes, on the inner surface of the lower housing MS2, numeric keys that are used to input alphanumeric characters or characters, and symbols, and a plurality of function keys that are used to input an instruction to supply or shut off power with respect to the mobile communication terminal. The input device 16 further includes a plurality of side keys 16e that are provided on the side surface of the lower housing MS2.

A first open/close detection section (not shown) is provided in the hinge MS3 to detect whether the upper and lower housings MS1 and MS2 are opened or closed. An open/close signal is output from the first open/close detection section.

In order to detect whether the upper and lower housings MS1 and MS2 are opened or closed, a first magnet MS4a is embedded at an upper part of the upper housing MS1 (a portion away from the hinge MS3), and a second magnet MS4b is embedded at a lower part of the lower housing MS2 (a portion away from the hinge MS3). Accordingly, in the closed state, a distance between the first and second magnets MS4a and MS4b becomes short.

For this reason, a second open/close detection section (not shown) may be provided to detect the state by a magnetic force acting between the first and second magnets MS4a and MS4b in the closed state, and an open/close signal may be output from the second open/close detection section. It may also be possible to detect, on the basis of the open/close signal output from the first open/close detection section and the open/close signal output from the second open/close detection section, whether the upper and lower housings MS1 and MS2 are opened or closed.

Figure 2:
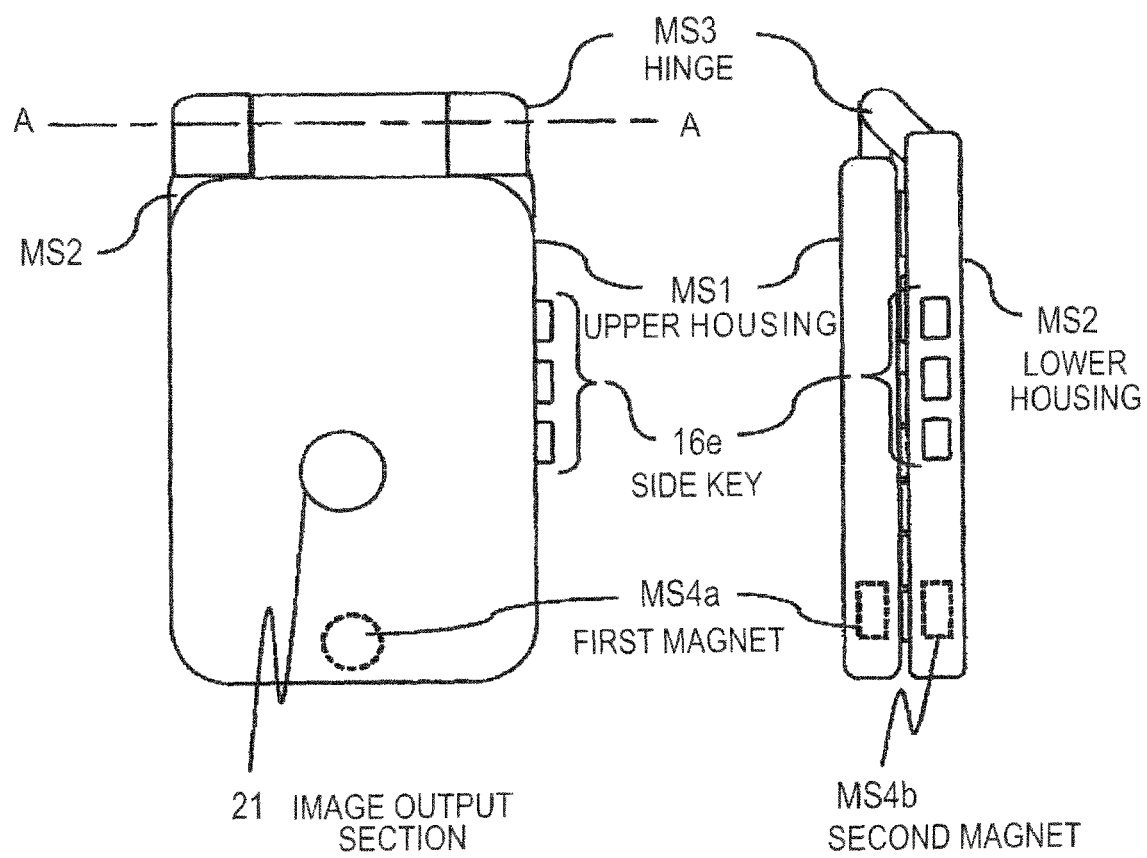
FIGS. 2A and 2B are exemplary exterior views of a foldable mobile communication terminal according to an embodiment of the invention in a state where upper and lower housings are closed.

FIGS. 2A and 2B show the exterior structure when the upper housing MS1 of the mobile communication terminal is rotated around the hinge MS3, and the folder is closed such that the upper housing MS1 is near the lower housing MS2. FIG. 2A is a front view, and FIG. 2B is a side view. In a state where the folder is closed, the display section 15 is inside the folder. Accordingly, the user cannot view display on the display section 15. In addition, the user can operate the side keys 16e from among the keys of the input device 16, but he/she cannot operate the keys provided on the inner surface of the lower housing MS2.

Meanwhile, since projection by the image output section 21 is performed outward, the user can view an image projected by the image output section 21, similarly to when the upper and lower housings MS1 and MS2 are opened.

Figure 3:
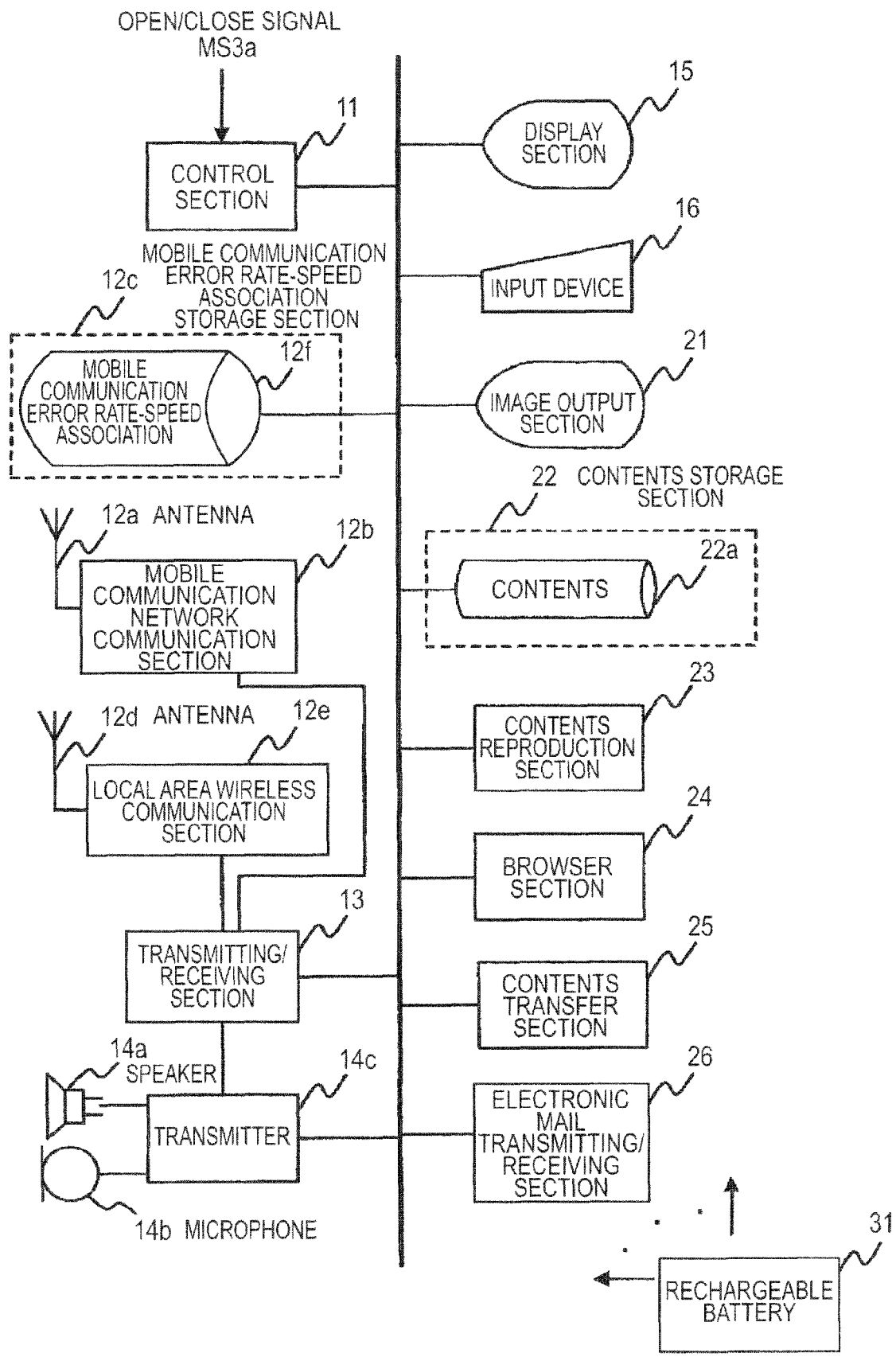
FIG. 3 is an exemplary block diagram showing the configuration of a mobile communication terminal according to an embodiment of the invention.

FIG. 3 is a block diagram showing the configuration of a mobile communication terminal, which is an example of a contents receiving apparatus according to an embodiment of the invention. The mobile communication terminal performs communication through a mobile communication network (not shown) and local area wireless communication by a wireless LAN (Local Area Network) system.

The mobile communication terminal includes a control section 11 that receives an open/close signal MS3a and controls the entire terminal, an antenna 12a that transmits/receives an electric wave to and from a base station (not shown), a mobile communication network communication section 12b, a mobile communication error rate-speed association storage section 12c, an antenna 12d that transmits/receives an electric wave to and from a wireless LAN access point (not shown), a local area wireless communication section 12e, a transmitting/receiving section 13, a speaker 14a, a microphone 14b, a transmitter 14c, a display section 15, and an input device 16.

The mobile communication terminal further includes an image output section 21, a contents storage section 22, a contents reproduction section 23, a browser section 24, a contents transfer section 25, an electronic mail transmitting/receiving section 26, and a rechargeable battery 31 that supplies power to the individual sections of the terminal.

The mobile communication error rate-speed association storage section 12c stores mobile communication error rate-speed association 12f. The mobile communication error rate-speed association 12f is information about association between an error rate for each bearer and a communication speed with respect to communication between the base station and the mobile communication network communication section 12b.

The contents storage section 22 stores contents 22a. The contents 22a include, but are not limited to, encoded or unencoded still images, encoded or unencoded motion images, documents including character strings, documents described in a page description language, documents described in a markup language, and programs running on the terminal.

The contents 22a may include encoded or unencoded sound. What is necessary is that the size (necessary storage capacity) is defined and display can be performed on the display section 15 or the image output section 21 as images. For example, binary codes other than the running programs may also be displayed as images if they are converted into characters in hexadecimal or the like.

As such, since the contents 22a include all files, the contents 22a and the files are not used as being distinguished from each other. Reproduction display of the contents 22a includes display of character strings, display by dumpling, and the like. Reproduction display includes a processing for decoding encoded signals, but any contents 22a may not require decoding.

The control section 11, the contents reproduction section 23, the browser section 24, the contents transfer section 25, and the electronic email transmitting/receiving section 26 may be implemented by a program running on a computer. The control section 11 executes the operation of an operating system (OS).

The operation of each section of the mobile communication terminal having the above-described configuration according to an embodiment of the invention will be described with reference to FIG. 3. First, the mobile communication network communication section 12b outputs a high-frequency signal received by the antenna 12a to the transmitting/receiving section 13 and transmits, to the antenna 12a, a high-frequency signal output from the transmitting/receiving section 13.

The local area wireless communication section 12e performs local area wireless communication according to a wireless LAN system, outputs a high-frequency signal received by the antenna 12d to the transmitting/receiving section 13, and transmits, to the antenna 12d, the high-frequency signal output from the transmitting/receiving section 13.

The transmitting/receiving section 13 amplifies, frequency converts, and demodulates the high-frequency signal from the mobile communication network communication section 12b to generate digital signals, and amplifies, frequency convents, and demodulates the high-frequency signal from the local area wireless communication section 12e to generate digital signals. Among the digital signals, a control signal is transmitted to the control section 11, a sound signal to the transmitter 14c, a Web signal is transmitted to the browser section 24, a contents transfer signal is transmitted to the contents transfer section 25, and an electronic mail signal is transmitted to the electronic mail transmitting/receiving section 26.

The transmitting/receiving section 13 receives a control signal output from the control section 11, a sound signal output from the transmitter 14c, a Web signal output from the browser section 24, a contents transfer signal output from the contents transfer section 25, and an electronic mail signal output from the electronic mail transmitting/receiving section 26. The transmitting/receiving section 13 modulates, frequency converts, and amplifies the digital signals to generate a high-frequency signal, and transmits the high-frequency signal to the mobile communication network communication section 12b. In addition, the transmitting/receiving section 13 modulates, frequency converts, and amplifies the digital signals to generate a high-frequency signal, and transmits the high-frequency signal to the local area wireless communication section 12e.

The transmitting/receiving section 13 can communicate with a communication device (not shown), which is connected to Internet, by the mobile communication network communication section 12b or the local area wireless communication section 12e. The mobile communication network communication section 12b ensures the terminal to perform communication, regardless of where the terminal is located, insofar as the terminal is located within a service area of a mobile communication network. In addition, the local area wireless communication section 12e ensures fast communication with low power consumption.

Digital data communication by the mobile communication network communication section 12b is performed through one of a plurality of bearers. The transmitting/receiving section 13 performs transmission/reception by the mobile communication network communication section 12b or the local area wireless communication section 12e. In case of the mobile communication network communication section 12b, a bearer through which digital data communication is to be performed is selected based on designation of a processing section as a momentum of data communication.

This designation may be made when data communication gets started or when data communication is being performed. The mobile communication network communication section 12b or the local area wireless communication section 12e, or a communication method to be identified by each bearer is called a communication path.

If no communication path is designated by the processing section, when fastest communication needs to be performed, and communication through the local area wireless communication section 12e is possible, the transmitting/receiving section 13 selects the local area wireless communication section 12e. When the local area wireless communication section 12e cannot be used, the transmitting/receiving section 13 selects the mobile communication network communication section 12b. The transmitting/receiving section 13 also selects a fastest bearer. Thus, a fastest communication path is selected. The selected communication path is notified to the processing section.

When selecting the fastest communication path, the transmitting/receiving section 13 selects the fastest communication path in accordance with a fastest communication speed defined in the specification of each communication path. The fastest communication path may be selected in accordance with an average communication speed in the specification or based on a previous communication history. In addition, the communication speed of each of the communication paths may be estimated in accordance with the intensity or quality, such as a signal to noise ratio, of an electric wave received by the communication section, and then the fastest communication path may be selected on the basis of the estimated communication speed.

When communication is being performed, the transmitting/receiving section 13 performs a handover in order to communicate with the mobile communication network without interruption at the fastest speed. The handover includes a handover to a different base station, a handover to a different bearer in the same base station, and a handover from one of the mobile communication network communication section 12b and the local area wireless communication section 12e to the other one.

The transmitter 14c converts the digital sound signal output from the transmitting/receiving section 13 into an analog sound signal, amplifies the analog sound signal, and sends the amplified analog sound signal to the speaker 14a. The transmitter 14c also amplifies the analog sound signal output from the microphone 14b, and converts the amplified analog sound signal into a digital sound signal, and transmits the digital sound signal to the transmitting/receiving section 13.

If the user can view the display section 15, that is, if it is determined on the basis of the open/close signal MS3a that the upper and lower housings MS1 and MS2 are opened, the display section 15 displays characters, numerals, or images under the control of the control section 11. In this case, data displayed on the display section 15 is switched by an instruction from the control section 11 in response to a key operation from the input device 16 or an incoming call signal. The images include images from the contents 22a stored in the contents storage section 22. Therefore, the expression that the display section 15 displays contents is used. The display luminance of the display section 15 varies under the control of the control section 11.

When the user cannot view the display section 15, that is, when it is determined on the basis of the open/close signal MS3a that the upper and lower housings MS1 and MS2 are closed, the control section 11 controls the display section 15 so as not to execute a display operation. When the user does not operate any key of the input device 16 or no event occurs for a predetermined time, the control section 11 controls the display section 15 so as not to execute the display operation and/or decreases the display luminance of the display section 15.

To control the display section 15 so as not to execute the display operation or to decrease luminance is accompanied by turning-off of a backlight of the display section 15 or a decrease in luminance. The event includes reception of an incoming call signal or end of a call.

The input device 16 includes keys, that is, numeral keys for assigning a telephone number to dial, and a plurality of function keys. If a key of the input device 16 is operated, the key input is received, and an identifier of the key is notified to the control section 11. The identifier is received by a processing section through the control section 11 and the control section 11 and displayed on the display section 15 as characters, and a corresponding operation is executed.

The image output section 21 projects images under the control of the control section 11. The images include images from the contents 22a stored in the contents storage section 22. Therefore, the expression that the image output section 21 display contents is used. The display luminance of the image output section 21 varies under the control of the control section 11.

If the user does not operate any key of the input device 16 or no event occurs for a predetermined time, when the control section 11 controls the display section 15 so as not to execute a display operation and/or decreases the display luminance of the display section 15, similarly, the control section 11 may control the image output section 21 so as not to execute a display operation and/or may decrease the display luminance of the image output section 21.

In particular, when display by the image output section 21 structurally helps the user to view display, for example, when projection by the image output section 21 is performed at a short distance from the terminal, the above control may not be performed. In addition, when display by the image output section 21 is identical to display by the display section 15, the above control may not be performed. This is because it is not necessary to control display by the image output section 21 and display by the display section 15 so as not to be performed within the predetermined time, or to decrease luminance.

The contents reproduction section 23 selects contents 22 stored in the contents storage section 22 on the basis of a key operation of the input device 16 or in accordance with an instruction from each section of the terminal, and reproduces the selected contents 22a to display the contents 22a on the display section 15 and/or the image output section 21.

The contents reproduction section 23 displays contents with luminance according to a key operation of the input device 16 or designation of the processing section, which instructs to display contents. When contents 22a include sound, sound is generated from the speaker 14a and/or a second speaker (not shown) for notification sound generation.

The browser section 24 accesses a Web server apparatus (not shown), and controls the display section 15 and/or the image output section 21 to display an image received from the Web server apparatus.

That is, when a key of the input device 16 is operated, the browser section 24 is activated by the control section 11, accesses a Web server apparatus, which is designated by a key operation of the input device 16 or is identified by information stored in the browser section 24 beforehand, and controls the display section 15 and/or the image output section 21 to display a Web page to be transmitted from the apparatus.

If a button on a Web page to be displayed is selected by a key operation of the input device 16, the browser section 24 receives a Web page associated with the button, and controls the display section 15 and/or the image output section 21 to display the Web page.

When contents are associated with the button, the browser section 24 receives the contents and stores the contents in the contents storage section 22 as the contents 22a, and controls the contents reproduction section 23 to reproduce the stored contents 22a. When a key of the input device 16 is operated, the operation of the browser section 24 is ended.

The contents transfer section 25 transfers contents to and from a contents server apparatus (not shown), and controls the display section 15 and/or the image output section 21 to display contents received from the contents server apparatus. That is, when a key of the input device 16 is operated, the contents transfer section 25 is activated by the control section 11, and accesses a contents server apparatus which is designated by a key operation of the input device 16 or is identified by information stored in the contents transfer section 25 beforehand.

The contents transfer section 25 receives contents stored in the contents server apparatus, which is designated by a key operation of the input device 16 or is identified by information stored in the contents transfer section 25 beforehand, stores the contents in the contents storage section 22 as the contents 22a, and controls the contents reproduction section 23 to reproduce the stored contents 22a. When a key of the input device 16 is operated, the operation of the contents transfer section 25 is ended.

The electronic mail transmitting/receiving section 26 transmits and receives an electronic mail. When transmitting an electronic mail, the electronic mail transmitting/receiving section 26 is activated by a key operation of the input device 16, and transmits the title and the body of an electronic mail created by key operations of the input device 16 to a mail server apparatus (not shown) with a destination address input by a key operation of the input device 16 designated. In this case, the contents 22a is attached as an attached file in accordance with an instruction based on a key operation of the input device 16.

When receiving an electronic mail, if an electronic mail incoming signal is received, the electronic mail transmitting/receiving section 26 is activated by the control section 11, and receives the header and the body of an electronic mail from the mail server apparatus. The header includes at least the sender's address and the title of the electronic mail. The header and the body of the received electronic mail are stored in a mailbox (not shown) in the electronic mail transmitting/receiving section 26. In addition, the header and the body of the electronic mail stored in the mailbox are also displayed on the display section 15 and/or the image output section 21.

When the electronic mail has an attached file, the electronic mail transmitting/receiving section 26 receives the attached file in accordance with a key operation of the input device 16, stores the received file in the contents storage section 22 as the contents 22a, and instructs the contents reproduction section 23 to display the stored contents 22a on the display section 15 and/or the image output section 21. When a key of the input device 16 is operated, the operation of the electronic mail transmitting/receiving section 26 is ended.

A description will now be provided for an operation of each processing section of the mobile communication terminal according to the embodiment of the invention, that is, each of the browser section 24, the contents transfer section 25, and the electronic mail transmitting/receiving section 26, to receive contents through a communication section of the mobile communication section, that is, the mobile communication network communication section 12b or the local area wireless communication section 12e, and to control the display section 15 and/or the image output section 21 to display the contents.

FIG. 4 shows an example of the configuration of the mobile communication error rate-speed association 12f stored in the mobile communication error rate-speed association storage section 12c. The mobile communication error rate-speed association 12f includes bearers, for example, a first bearer 12g-1, a second bearer 12g-2, a third bearer 12g-3, and a fourth bearer 12g-4, which are arranged in a vertical direction.

Error rates including a first error rate 12h-1, a second error rate 12h-2, a third error rate 12h-3, and a fourth error rate 12h-4 are arranged in a horizontal direction. The mobile communication error rate-speed association 12f is information of a two-dimensional table format including four items in each of the vertical and horizontal directions.

This table indicates association between a communication error rate for each bearer and a communication speed with respect to communication between the base station and the mobile communication network communication section 12b. For example, if a bearer is an i-th bearer 12g-i, and an error rate is a j-th error rate 12h-j, a communication speed is Xijbps (Bits Per Second).

In the mobile communication error rate-speed association 12f of FIG. 4, i is a natural number ranging from 1 to 4, and j is a natural number ranging from 1 to 4 ($1 \leq i \leq 4$ and $1 \leq j \leq 4$). The descriptions of an allowable range of i and an allowable range of j will be omitted. The allowable range of i and the allowable range of j are not limited thereto.

An i-th bearer 12g-i is communication by a basic channel to be used for voice communication and data communication, communication by an exclusive channel for data communication, or communication by an HSDPA (High Speed Downlink Packet Access) system. The first error rate 12h-1 indicates an error rate 0, that is, no error is mixed.

A k-th error rate 12h-k is larger than a (k−1)th error rate 12h-k−1. Here, k is a natural number ranging from 2 to 4 (k-th error rate 12h-k>(k−1)th error rate 12h-k−1, and $2 \leq k \leq 4$). If an error rate is large, a communication speed is low. Therefore, a communication speed Xik is lower than a communication speed Xik−1 (Xik<Xik−1). The description of an allowable range of k will be omitted.

The mobile communication error rate-speed association 12f of FIG. 4 has the four items in each of the vertical and horizontal directions, but this is not intended to limit the invention. The number of items in the vertical direction is the number of bearers, and at least one item is provided. The number of items in the horizontal direction indicates how finely the error rate is set, and at least two items are provided. This is because at least an item having an error rate of zero (0) and an item having an error rate of nonzero are required.

Figure 5:
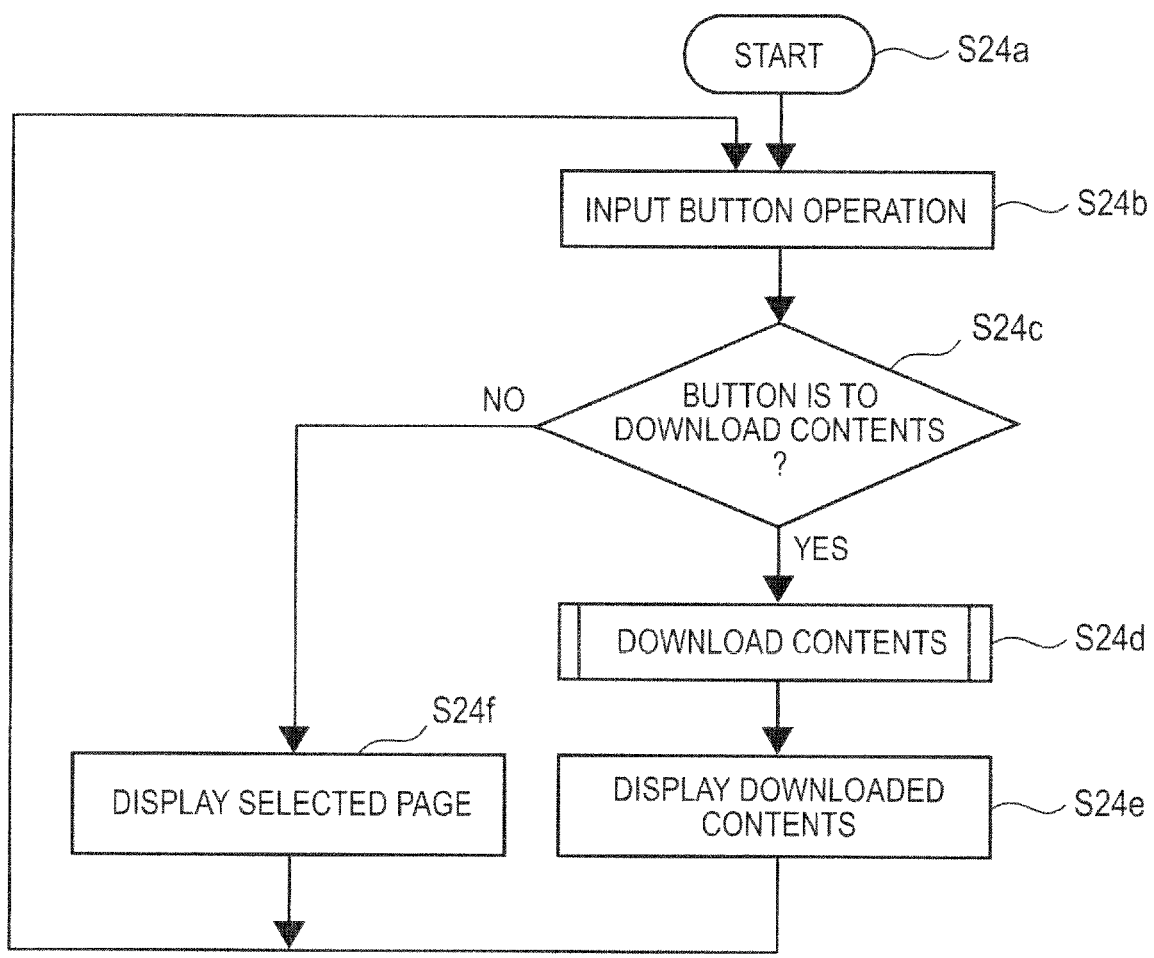
FIG. 5 is an exemplary flowchart illustrating an operation of a browser section to receive contents and display the contents according to an embodiment of the invention.

FIG. 5 is a flowchart illustrating an operation of the browser section 24 to receive contents and control the display section 15 and/or the image output section 21 to display the contents. While a Web page is displayed, the browser section 24 starts an operation to receive and display contents (Step S24a). In this case, display is performed with high luminance. A description regarding whether display in Step S24a and later is display on the display section 15 or display on the image output section 21 will be provided below.

The browser section 24 inputs a button operation on the Web page, that is, inputs selection of an option instructing to receive a different Web page. For example, a cursor is moved onto the button by an operation of the cross selection key 16b, and then an operation of the enter key 16a is input (Step S24b). Next, it is determined whether or not the button is a button that instructs to download contents (Step S24c).

If it is determined that it is the button that instructs to download contents, the browser section 24 instructs the transmitting/receiving section 13 to download contents to be identified by the button, and stores the downloaded contents in the contents storage section 22 as the contents 22a. Next, the browser section 24 receives a notification of download completion from the transmitting/receiving section 13 (Step S24$d$), and controls the contents 22$a$ to be reproduced (Step S24$e$). Next, the browser section 24 returns to the operation to input a button operation of Step S24$b$. The operation of Step S24$d$ will be described below in detail.

In regards to reproduction display of the contents 22$a$ in Step S24$e$, a window to be displayed may be a part of a window allocated to the browser section 24 or the entire window, or a different window. Reproduction display may be performed by the contents reproduction section 23 or the browser section 24. The downloaded contents may be stored in the browser section 24, not the contents storage section 22.

If it is determined in Step S24$c$ that the button is not the button that instructs to download contents, the button is a button that selects and displays a Web page different from the Web page being displayed. In this case, the browser section 24 displays the selected Web page (Step S24$f$). Next, the browser section 24 returns to the operation to input a button operation of Step S24$b$.

Figure 6:
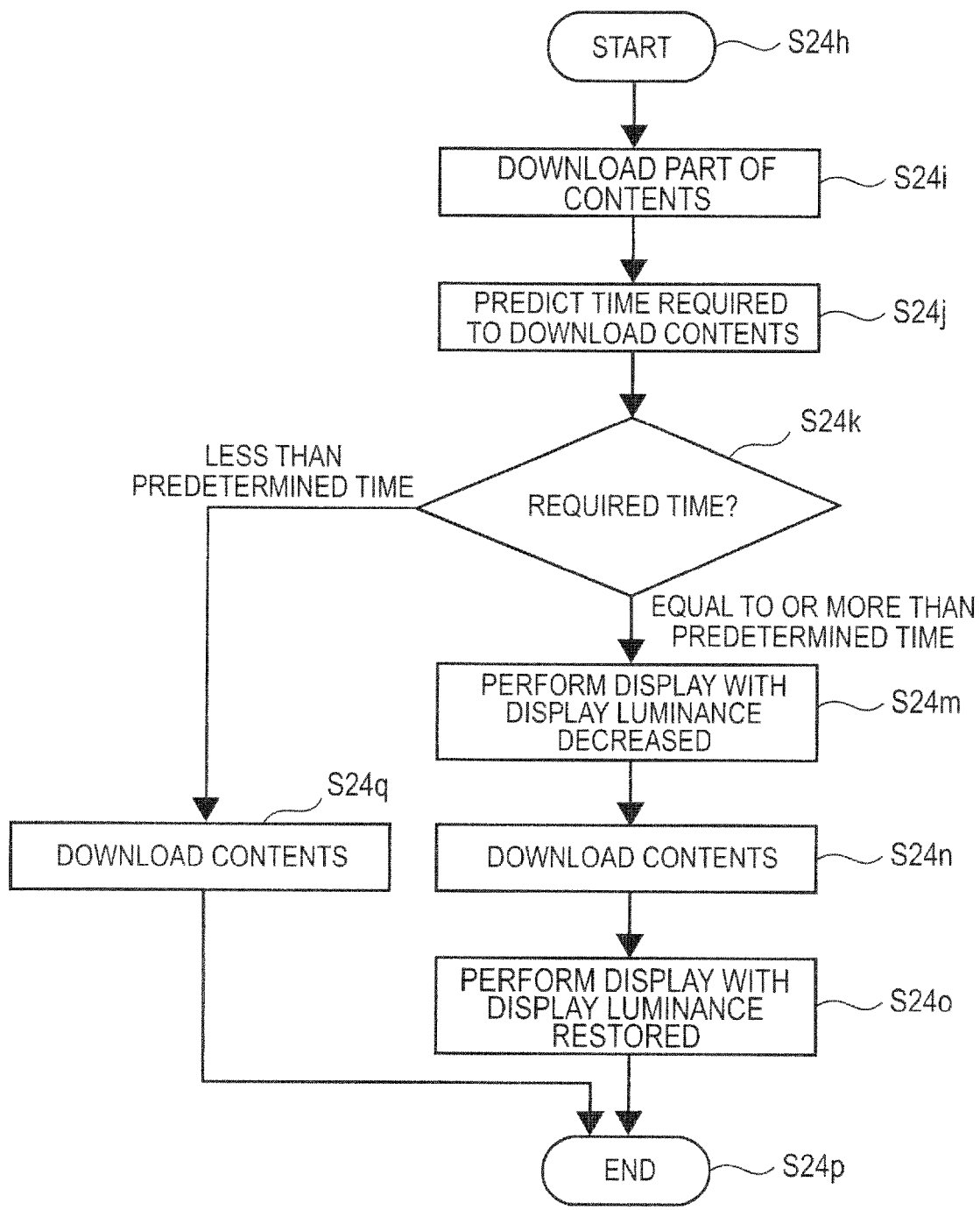
FIG. 6 is an exemplary detailed flowchart illustrating an operation of a browser section to download contents according to an embodiment of the invention.

The operation to download contents in Step S24$d$ will be described in detail. FIG. 6 is a detailed flowchart illustrating the operation of the browser section 24 to download contents. The browser section 24 starts to download contents (Step S24$h$), and instructs the transmitting/receiving section 13 to download the contents. When the instruction is input, a communication path is not designated, a communication path selected by the transmitting/receiving section 13 is notified from the transmitting/receiving section 13. When a part of the beginning of the contents are downloaded (Step S24$i$), a time required to download contents is predicted (Step S24$j$), In this case, the browser section 24 predicts the time required to download an undownloaded portion of the contents. In this specification, for simple explanation, the expression that the time required to download contents is predicted is used.

The time required to download contents is predicted as follows. In Step S24$i$, the browser section 24 obtains a communication speed during a previous download operation on the basis of a quotient calculated by dividing the size of the downloaded contents by the time elapsed of the previous download operation. Next, a communication speed for a next download operation is predicted on the basis of the communication speed during the previous download operation.

For example, the browser section 24 predicts that the communication speed for the next download operation is identical to the communication speed during the previous download operation. Next, the time required to download contents is predicted by dividing the size of the contents by the communication speed for the next download operation. The size of contents to be downloaded is obtained as the attribute of a button to be operated.

In Step S24$i$, the download operation of a part of contents is performed in order to predict the time required to download contents. Therefore, Step S24$i$ and Step S24$j$ may be executed by the browser section 24 as a single step.

If a part of contents is small, the time required to download contents can be rapidly predicted. However, when the download operation starts, the communication speed for the download operation may be unstable. For this reason, in Step S24$i$, the browser section 24 executes the download operation until the speed becomes stable for every short time. When the speed does not become stable for every short time, the download operation is executed until an average communication speed becomes asymptotically uniform after the download operation starts.

The browser section 24 compares the predicted time required to download contents with a predetermined time (Step S24$k$). When the time required to download contents is equal to or more than the predetermined time, the browser section 24 displays the contents with luminance decreased. Display with luminance decreased includes non-display (Step S24$m$).

An arbitrary matter is displayed. For example, a Web page transmitted from the Web server apparatus or a sandglass image may be displayed. In addition, the Web page and the sandglass image may be displayed together. The sandglass image indicates that contents are being downloaded and it takes a time until the contents are downloaded.

A progress bar may be displayed. In addition, a Web page transmitted from the Web server apparatus and the progress bar may be displayed together. The progress bar indicates a ratio of a downloaded portion of contents to the size of contents. The progress bar is a bar graph-shaped figure, and a part of the bar graph-shaped figure is displayed so as to be different from the remaining portion, for example, with a different color from the remaining portion. A ratio of the different portion indicates the ratio of the downloaded portion of the contents.

If the contents are downloaded (Step S24$n$), the browser section 24 displays the contents with luminance restored (Step S24$o$), and ends the download operation (Step S24$p$). When restoring luminance, the browser section 24 may restore the display luminance of the image output section 21, but may not restore the display luminance of the display section 15, such that display is performed with low luminance, or may control display so as not to be performed. This is because, if the display luminance of the image output section 21 is restored, it is not necessary to control the display section 15 to perform display.

After the download operation is completed, the browser section 24 restores luminance, but this is not intended to limit the invention. Luminance may be restored before the contents are displayed in Step S24$e$ of FIG. 5. When the browser section 24 does not transmit any signal to the display section 15, the display section 15 may not perform display. In addition, when no signal is transmitted to the image output section 21, the image output section 21 may not perform display.

In Step S24$k$, when the time required to download contents is less than the predetermined time, if the contents are downloaded (Step S24$q$), the browser section 24 ends the download operation (Step S24$p$). In Step S24$q$, the browser section 24 changes the display luminance, but this is not intended to limit the invention. The browser section 24 may control the display section 15 to perform display with low luminance or not to perform display. This is because, if the contents are displayed on the image output section 21, it is not necessary to display the contents on the display section 15.

When the contents are a motion image, and the motion image is reproduced by streaming, the browser section 24 predicts whether or not an unreceived portion of the motion image is received after a part of the motion image is received until the received portion of the motion image is reproduced. That is, the time required to download contents means the time required to download data that is necessary to start playing back the motion image.

When it is predicted that the unreceived portion of the motion image is received, the browser section 24 ends the download operation of Step S24$p$ while continuing the download operation of Step S24$n$ or Step S24$q$, and performs reproduction display of the contents of Step S24$e$ (not shown). When the download operation of Step S24$n$ is being executed, the operation to restore luminance in Step S24$o$ is executed before the download operation of Step S24$p$ is ended.

From the predicted communication speed for the download operation described in Step 24*j*, it is possible to easily determine whether or not the unreceived portion of the motion image is received after a part of the motion image is received until the received portion of the motion image is reproduced.

While contents are downloaded, the communication speed may be changed. For this reason, during the download operation of Step S24*q*, the browser section 24 may predict the time required to download contents in Step S24*j*, compare the predicted time with the predetermined time in Step S24*k*, and if the predicted time is equal to or more than the predetermined time, may control display to be performed with luminance decreased in Step S24*m*. During the download operation of Step S24*n*, since display is performed with luminance decreased in Step S24*m*, it is not necessary to execute Steps S24*j* to S24*m*.

While the browser section 24 receives the contents, and controls the display section 15 and/or the image output section 21 to display the contents, an operation of the browser section 24 to control the display section 15 or the image output section 21 to display contents will be described with reference to FIGS. 5 and 6.

A first display control operation is an operation when the terminal is in a mode in which the display section 15 and the image output section 21 perform the same display, and includes display on the display section 15 and display on the image output section 21. That is, the browser section 24 constantly controls the display section 15 and the image output section 21 to display contents. In this case, display with luminance decreased in Step S24*m* is performed by the following two methods.

A first method controls one of the display section 15 and the image output section 21 to perform display with luminance decreased. Alternatively, one of them may not perform display. That is, the other one is performed with luminance unchanged, and thus it is possible to easily view that contents are being downloaded. If display on the image output section 21 is performed with luminance decreased or is not performed, that is, display on the display section 15 is performed with luminance unchanged, power consumption can be significantly reduced. This is because power consumption of the image output section 21 is larger than power consumption of the display section 15.

If display on the display section 15 is performed with luminance decreased or is not performed, that is, display on the image output section 21 is performed with luminance unchanged, a person other than the user who views the image output section 21 can easily view that contents are being downloaded.

A second method controls both the display section 15 and the image output section 21 to perform display with luminance decreased. Alternatively, both of them may not perform display. One of display on the display section 15 and display on the image output section 21 may be performed with luminance decreased, or may not be performed. According to this method, it will be apparent that significant power consumption can be reduced, as compared with the first method. If display on the display section 15 is continued with low luminance, significant power consumption can be achieved. In addition, if display on the image output section 21 is continued with low luminance, a person other than the user who views the image output section 21 can easily view that contents are being downloaded.

A second display control operation is an operation when the terminal is in a mode in which the display section 15 and the image output section 21 are permitted to perform different display. Specifically, when the browser section 24 starts to receive contents and display the contents in Step S24*a*, the image output section 21 displays contents 22*a* from a processing section, for example, the contents reproduction section 23, other than the browser section 24.

In this case, the browser section 24 controls display on the display section 15 in accordance with one of the first method and the second method. In regards to display on the image output section 21, the browser section 24 does not perform a processing until the download operation of Step S24*d* is ended. From the operation to display downloaded contents of Step S24*e*, display by the browser section 24 is performed.

At this time, the operation to restore luminance of Step S24*o* in FIG. 6 is executed. This is because it is not clear how a processing section other than the browser section 24 controls the display luminance of the image output section 21. As a result, until the download operation of Step S24*d* is ended, display by a processing section other than the browser section 24 is continued with luminance unchanged.

According to the second display control operation, display on the image output section 21 is display related to contents download, not meaningless display. Until contents are displayed, display by a processing section other than the browser section 24 can be continued, and effective display can be provided to a person who views the image output section 21. The user can view the display section 15 to progress contents download.

During the operation of the browser section 24 to receive contents and display the contents, the communication path is selected by the transmitting/receiving section 13, but the communication path may be designated by the browser section 24. When the communication path is designated by the browser section 24, the same operation as the above operation is executed. The communication path is not changed after the browser section 24 starts to receive contents until the contents are received, but this is not intended to limit the invention.

If the communication path is changed while the contents are received, when the operation to decrease the display luminance in Step S24*m* is not executed (including when the contents are being downloaded in Step 24*q*), the browser section 24 predicts a time required to download an undownloaded portion of the contents in Step S24*j* before or after the time required to download contents is evaluated in Step S24*k*. In Step S24*k*, when the required time is equal to or more than the predetermined time, the operation to decrease the display luminance in Step S24*m* is executed, and then the contents are continued to be downloaded.

The communication path is changed due to the following two momentums. A first momentum is a handover by the transmitting/receiving section 13. When the handover is performed, the browser section 24 receives from the transmitting/receiving section 13 a notification purporting that handover is performed.

When the handover changes the communication path from the local area wireless communication section 12*e* to the mobile communication network communication section 12*b*, the communication speed may be decreased. In addition, when the terminal is moved, it is away from a wireless LAN access point, and as a result, the handover may be performed. Therefore, it is effective that the browser section 24 predicts the time required to download contents.

Figure 7:
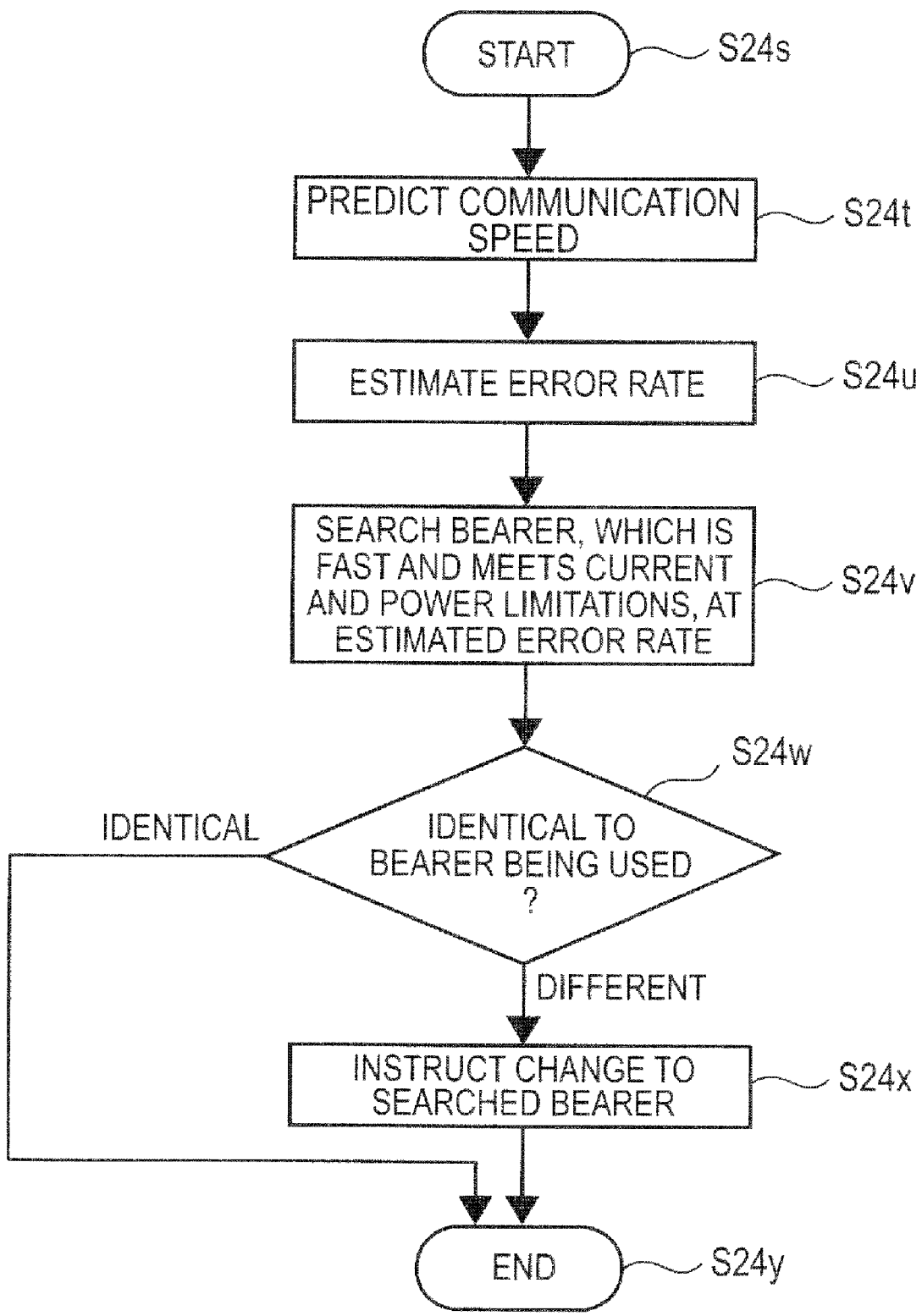
FIG. 7 is an exemplary flowchart illustrating an operation of a browser section to instruct a change of a communication path.

A second momentum is an instruction to change a communication path from the browser section 24 with respect to the transmitting/receiving section 13. An operation of the browser section 24 to instruct a change of a communication path will be described. FIG. 7 is a flowchart illustrating an operation of the browser section 24 to instruct a change of a communication path.

The operation of the browser section 24 to instruct a change of a communication path starts when the communication speed is predicted in Step S24$i$, when a notification purporting that a handover is performed is received from the transmitting/receiving section 13, or each time a predetermined time elapses while contents are downloaded in Steps S24$n$ and Step S24$q$ (Step S24$s$).

Next, the browser section 24 predicts a communication speed (Step S24$t$). When the operation starts with the communication speed obtained in Step S24$i$, since the communication speed has already been predicted, Step S24$t$ is not needed. When the operation starts with other momentums, the communication speed is predicted, as described in Step S24$i$.

When the communication path notified from the transmitting/receiving section 13 uses the mobile communication network communication section 12$b$, the browser section 24 executes the following operation. First, an error rate when the mobile communication network communication section 12$b$ is used is estimated with reference to the mobile communication error rate-speed association 12$f$ shown in FIG. 4 (Step S24$u$). That is, when the communication path notified from the transmitting/receiving section 13 is the i-th bearer 12$g$-$i$, if the error rate is the j-th error rate 12$h$-$j$, it is determined whether or not the communication speed becomes the communication speed obtained in Step S24$t$, that is, whether or not the communication speed obtained in Step S24$t$ is identical to the communication speed Xij.

If j is acquired when the communication speed obtained in Step S24$t$ and the communication speed Xij are identical to each other, the browser section 24 estimates that the error rate is the j-th error rate 12$h$-$j$. When the communication speed Xij which is identical to the communication speed obtained in Step S24$t$ is not obtained, it is determined whether or not the communication speed obtained in Step S24$t$ is a weighted average value of the communication speed Xik−1 and the communication speed Xik.

The communication speed obtained in Step S24$t$ is lower than the communication speed Xik−1 and higher than the communication speed Xik. The error rate is estimated as a weighted average value of the (k−1)th error rate 12$h$-$k$−1 and the k-th error rate 12$h$-$k$.

Next, the browser section 24 searches a bearer which is fast and meets limitations of current consumption and power consumption at the acquired error rate (Step S24$v$). The communication speed of each bearer is acquired as follows. That is, at the acquired the j-th error rate 12$h$-$j$, the communication speed Xij is predicted by the i-th bearer 12$g$-$i$. When the acquired error rate is the weighted average value of the (k−1)th error rate 12$h$-$k$−1 and the k-th error rate 12$h$-$k$, the communication speed of the i-th bearer 12$g$-$i$ is predicted as the weighted average value of the communication speed Xik−1 and the communication speed Xik.

The limitations of current consumption and power consumption are as follows. That is, the browser section 24 stores current consumption required for communication by the first to fourth bearers 12$g$-1 to 12$g$-4 in the browser section 24. When the total sum of current consumption for communication by a bearer, current consumption for display on the display section 15, current consumption for display on the image output section 21, and current consumption for a telephone call is lower than current consumption defined as the attribute of the rechargeable battery 31, it is determined that the bearer meets the limitation of current consumption.

When the operation to decrease the display luminance in Step S24$m$ is executed, current consumption for display on the display section 15 and current consumption for display on the image output section 21 have different values depending on the operation. Power consumption for a telephone call is added because a call may start while contents are downloaded.

The browser section 24 acquires the time required to download contents through communication by each of the first to fourth bearers 12$g$-1 to 12$g$-4 with reference to the acquired communication speed of a corresponding bearer. The amount of power consumption for download using each bearer is acquired by multiplying the time required to download contents, current consumption for communication by a corresponding one of the first to fourth 12$g$-1 to 12$g$-4 stored in the browser section 24, and an output voltage of the rechargeable battery 31.

The amount of power consumption for display on the display section 15 for a predetermined time is added to the amount of power consumption for display on the image output section 21 for a predetermined time, thereby acquiring the total amount of power consumption. According to the total amount of power consumption, if the amount of power accumulated in the rechargeable battery 31 is less than the amount of power for a telephone call for a predetermined time, the browser section 24 determines that the bearer does not meet the limitation of power consumption. Meanwhile, if not, it is determined that the bearer meets the limitation of power consumption.

As described above, the browser section 24 acquires a bearer having a fastest communication speed from among the bearers, which meet the limitations of current consumption and power consumption, and determines whether or not the acquired bearer is identical to a bearer being used, that is, a bearer notified from the transmitting/receiving section 13 (Step S24$w$).

If both are different from each other, the browser section 24 instructs the transmitting/receiving section 13 to change the communication path, that is, to use the acquired bearer (Step S24$x$), and ends the operation to instruct a change of a communication path (Step S24$y$). Meanwhile, if both are the same, the browser section 24 ends the operation to instruct a change of a communication path (Step S24$y$).

In Step S24$u$, when the communication path notified from the transmitting/receiving section 13 uses the local area wireless communication section 12$e$, the browser section 24 does not execute the steps subsequent to the operation to estimate an error rate in Step S24$u$, and directly ends the operation to instruct a change of a communication path (Step S24$y$). This is because, in terms of contents download, communication using the local area wireless communication section 12$e$, that is, communication by the wireless LAN system is excellent in communication speed, current consumption, and power consumption, as compared with communication using the mobile communication network communication section 12$b$.

In the foregoing description, the browser section 24 estimates an error rate and predicts a communication speed by communication of each bearer at the estimated error rate with reference to the mobile communication error rate-speed association 12$f$ of a table format shown in FIG. 4, but this is not intended to limit the invention. The error rate and the communication speed may be obtained by equations.

When equations are used, if a program corresponding to each equation is stored, it can be considered that the mobile communication error rate-speed association 12$f$ is stored. The table format enables reduction of an arithmetic operation time. In addition, the equations do not require a storage capacity for storing a table, and ensures an accurate error rate and an accurate communication speed.

An image to be displayed on the display section 15 and an image to be projected by the image output section 21 are illustrated while the browser section 24 receives contents and controls the display section 15 and/or the image output section 21 to display the contents, as described with reference to FIGS. 5 to 7. The images are just illustrated for understanding of the operation of the browser section 24, but the image display operation of the browser section 24 is not limited to display of the illustrated images.

Figure 8:
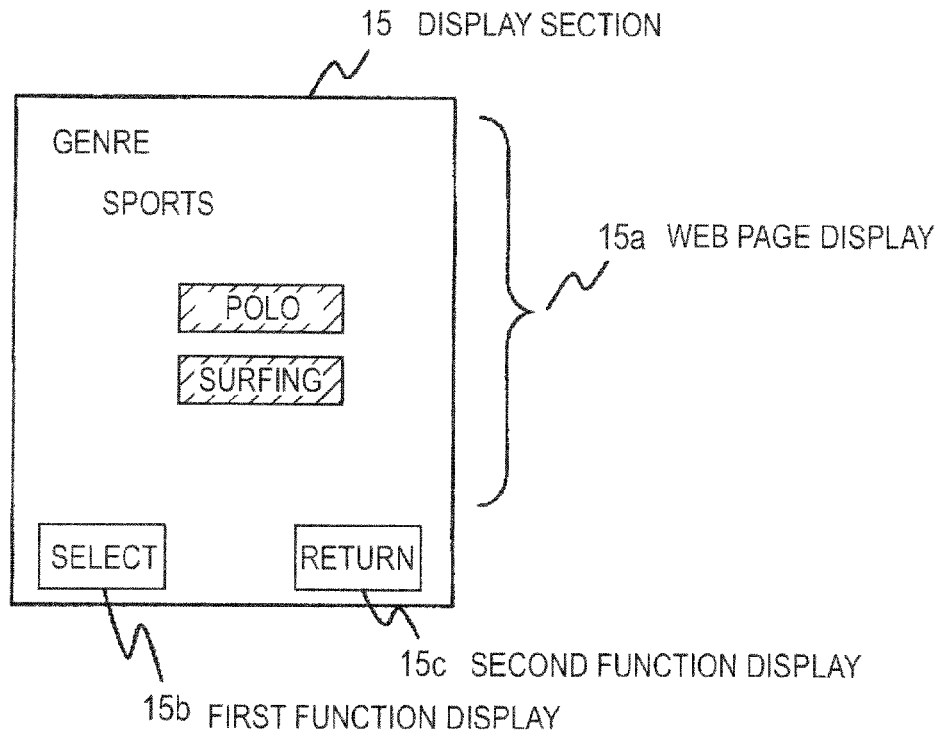
FIG. 8 is an exemplary diagram showing a first example of an image to be displayed on a display section during an operation of a browser section according to an embodiment of the invention.

First, a first illustration will be described. FIG. 8 shows an example of an image to be displayed on the display section 15 when a button operation on a Web page is input in Step S24*b* of FIG. 5. In this example, Web page display 15*a* is displayed in an upper half portion of the display section 15. First function display 15*b*, "select", is displayed in a lower left portion of the display section 15, and second function display 15*c*, "return", is displayed in a lower right portion of the display section 15. In this case, projection by the image output section 21 is the same as the image to be displayed on the display section 15.

In the Web page display 15*a*, hatching is used to indicate that "polo" and "surfing" are buttons as selectable options. In addition, hatching is used to indicate that the browser section 24 executes the same operation by an operation of the first function key 16*c* near the first function display 15*b*, instead of an operation of the enter key 16*a*.

The browser section 24 returns to a state where a key operation of the input device 16, which was performed last, is not executed, by an operation of the second function key 16*d* near the second function display 15*c*. Referring to the flowchart of FIG. 5, the browser section 24 returns a state where an operation in a last step is not executed. The instructions by the operation of the first function key 16*c* and the operation of the second function key 16*d* are hereinafter common to all cases where the first function display 15*b* and the second function display 15*c* are shown.

Figure 9:
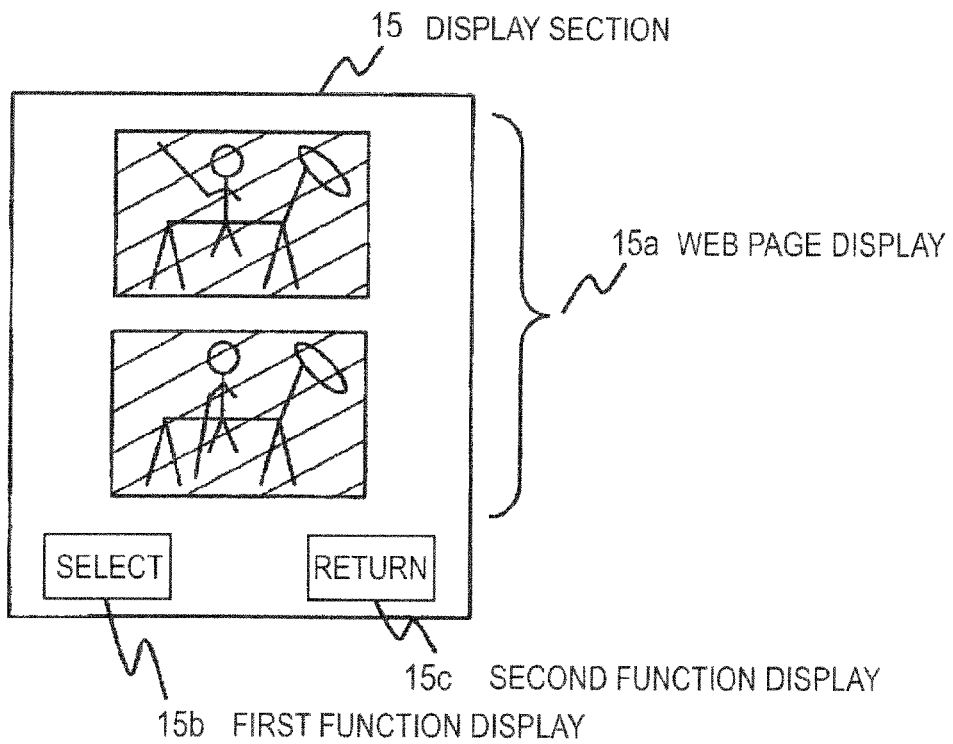
FIG. 9 is an exemplary diagram showing a second example of an image to be displayed on a display section during an operation of a browser section according to an embodiment of the invention.

In case of display of FIG. 8, the button "polo" is not a button that instructs to download contents, but a button that displays a Web page different from a Web page being displayed. Accordingly, if the button "polo" is operated, the browser section 24 executes to display a Web page selected in Step S24*f* of FIG. 5, such that an image shown in FIG. 9 is displayed on the display section 15. Then, the browser section 24 returns to the operation to input a button operation of Step S24*b* in FIG. 5. In this case, projection by the image output section 21 is the same as the image to be displayed on the display section 15.

In the image of FIG. 9, Web page display 15*a* is displayed in an upper half portion of the display section 15. First function display 15*b*, "select", is displayed in a lower left portion of the display section 15, and second function display 15*c*, "return", is displayed in a lower right portion of the display section 15. In the Web page display 15*a*, two still images as the background during a polo game are arranged in a vertical direction, and the two still images are hatched to indicate that they are buttons as selectable options.

In case of display of FIG. 9, the buttons of the two still images are buttons that instruct to download contents. Accordingly, if an upper button is operated, the browser section 24 starts to download contents to be identified by the button by the operation of Step S24*d* in FIG. 6. After the download operation starts, an image before the button operation is input, that is, the image shown in FIG. 9 is displayed on the display section 15. However, in the Web page display 15*a*, since one of the two still images has already been operated, they are not buttons to be operated, and thus they are displayed with no identification as buttons.

Figure 10:
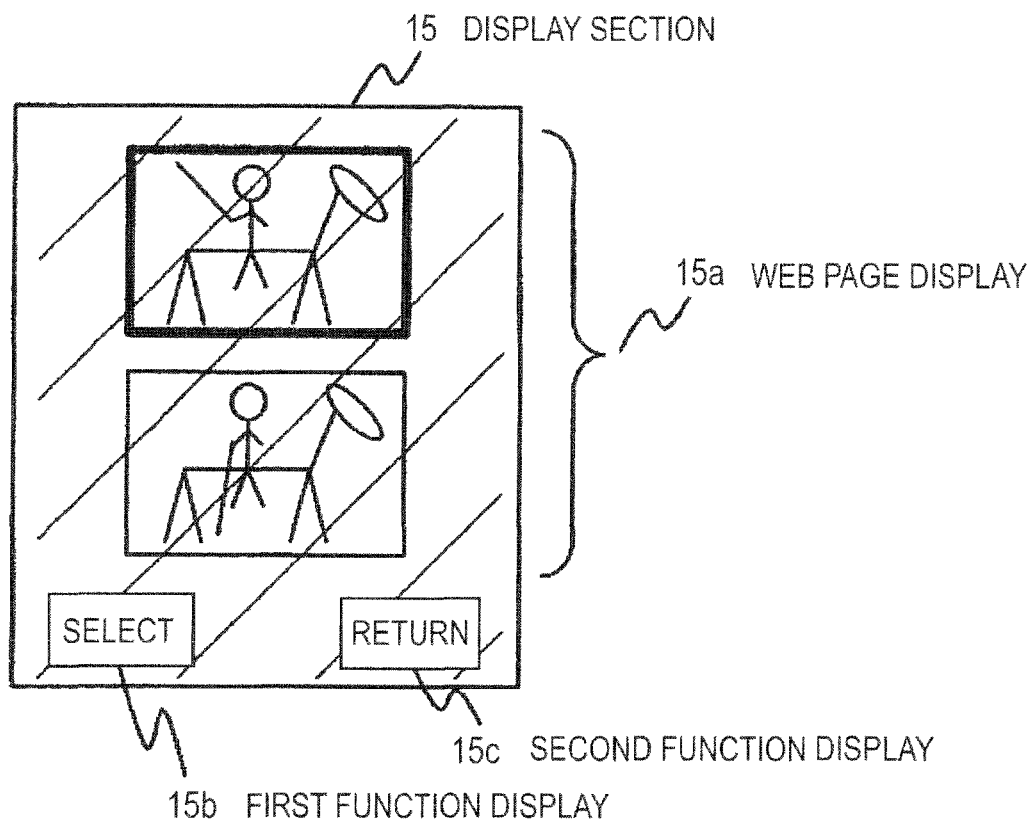
FIG. 10 is an exemplary diagram showing a third example of an image to be displayed on a display section during an operation of a browser section according to an embodiment of the invention.

An image shown in FIG. 10 is displayed on the display section 15 by the operation to decrease the display luminance of Step S24*m* in FIG. 6. The image shown in FIG. 10 is similar to the image shown in FIG. 9, but has the following differences. First, the entire image is displayed with low luminance. The entire image is hatched to indicate that the image is displayed with low luminance.

As described above, since one of the two still images in the Web page display 15*a* has already been operated, they are not buttons to be operated. Accordingly, referring to FIG. 10, the still images are not hatched. In addition, since an upper still image is a button that has been operated, it is displayed in a manner different from a lower still image, which is not operated, is performed. In FIG. 10, the upper still image is displayed to have a bold-line frame, which indicates different display.

Figure 11:
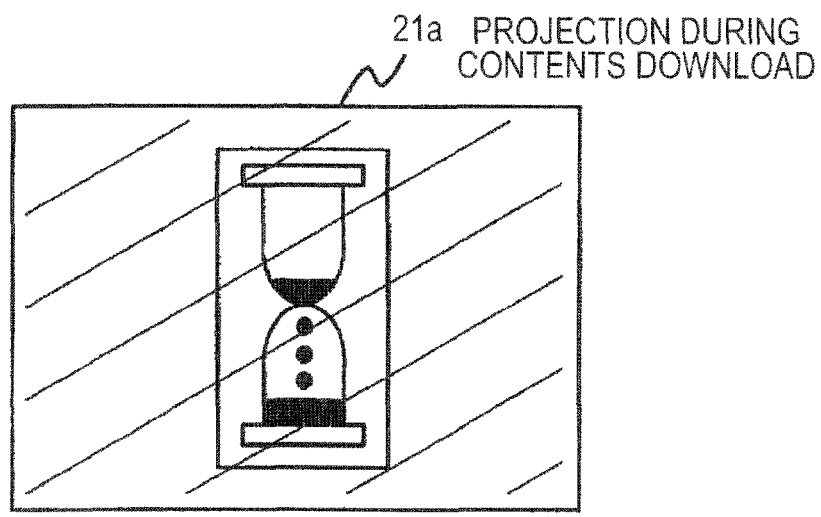
FIG. 11 is an exemplary diagram showing a first example of an image to be displayed on an image output section during an operation of a browser section according to an embodiment of the invention.

The image output section 21 performs projection 21*a* during contents downloaded shown in FIG. 11 by the display operation with the display luminance described in Step S24*m*. The projection 21*a* during contents download includes a sandglass image, and is projection with low luminance. The entire image is hatched to indicate that the image is displayed with low luminance.

The projection 21*a* during contents download does not include the first function display 15*b*, "select", and the second function display 15*c*, "return". This is because the first function display 15*b* and the second function display 15*c* indicate operations with respect to the browser section 24 and are displayed on the display section 15, and what is necessary is that the user can view display. However, the invention is not limited thereto. The projection 21*a* during contents download may include the first function display 15*b*, "select", and the second function display 15*c*, "return".

Figure 12:
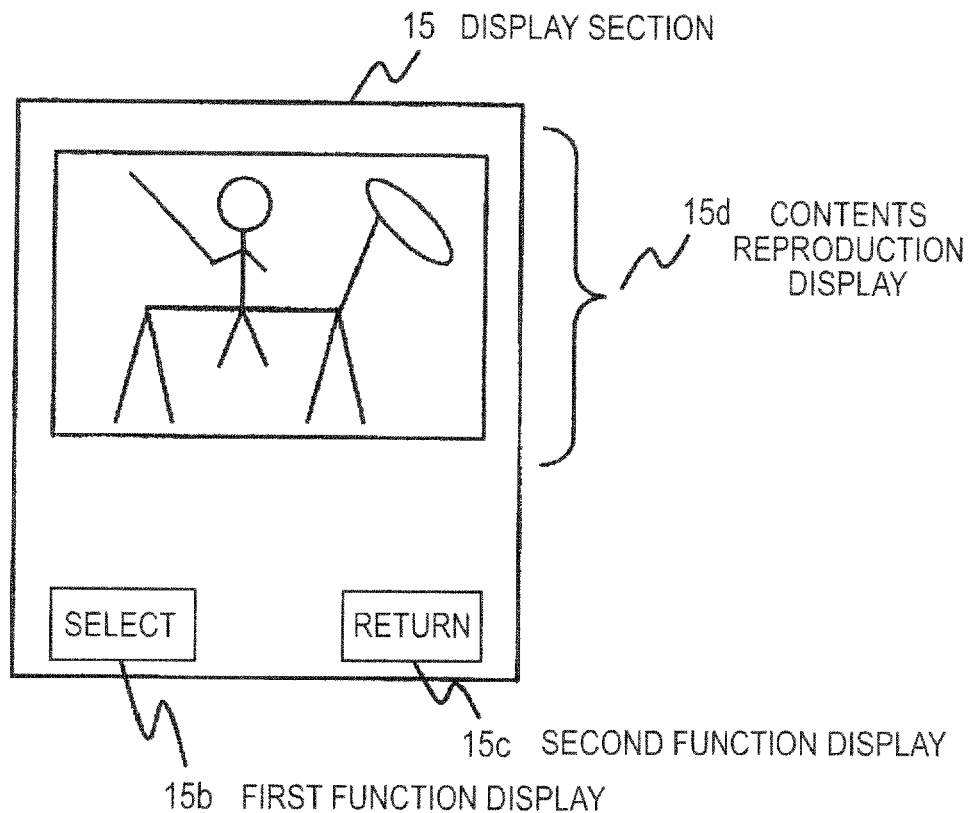
FIG. 12 is an exemplary diagram showing a fourth example of an image to be displayed on a display section during an operation of a browser section according to an embodiment of the invention.
Figure 13:
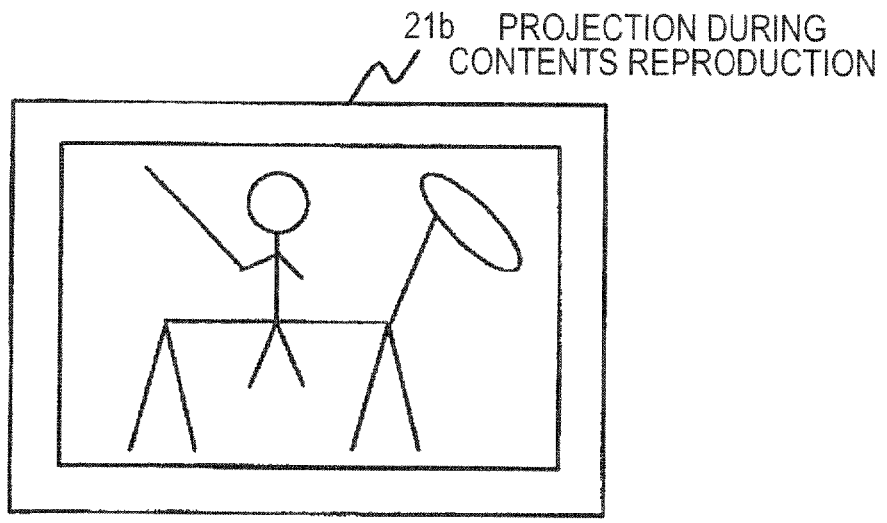
FIG. 13 is an exemplary diagram showing a second example of an image to be displayed on an image output section during an operation of a browser section according to an embodiment of the invention.

If the contents are downloaded, the display luminance is restored by the operation of Step S24*o*, and an image shown in FIG. 12 is displayed on the display section 15 by the operation of Step S24*e* in FIG. 5. In this image, contents reproduction display 15*d* is displayed in an upper half portion of the display section 15. First function display 15*b*, "select", is displayed in a lower left portion of the display section 15, and second function display 15*c*, "return", is displayed in a lower right portion of the display section 15. Projection 21*b* during contents reproduction shown in FIG. 13 is projected by the image output section 21. The contents reproduction display 15*d* and the projection 21*b* during contents reproduction display the same image.

The projection 21*b* during contents reproduction does not include the first function display 15*b*, "select", and the second function display 15*c*, "return". This is because the first function display 15*b* and the second function display 15*c* indicate operations with respect to the browser section 24 and are displayed on the display section 15, and what is necessary is that the user can view display. However, the invention is not limited thereto. The projection 21*b* during contents reproduction may include the first function display 15*b*, "select", and the second function display 15*c*, "return".

Next, a second illustration will be described. The second illustration is a display example when contents 22*a* are displayed on the image output section 21 by the contents reproduction section 23 when the browser section 24 starts to receive contents and display the contents in Step S24*a* of FIG. 5. A difference from the first illustration will be described.

Figure 14:
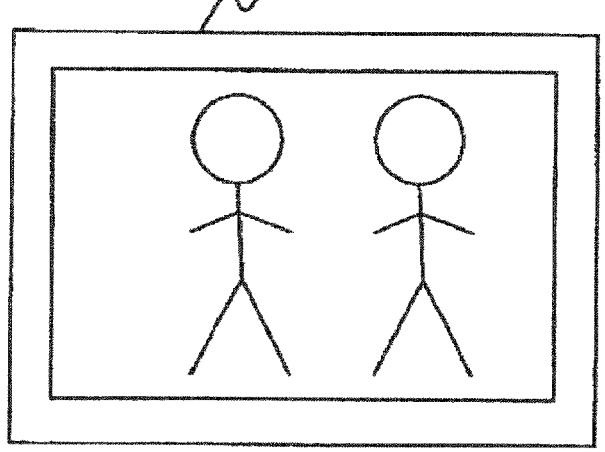
FIG. 14 is an exemplary diagram showing a third example of an image to be displayed on an image output section during an operation of a browser section according to an embodiment of the invention.

In the second illustrating, instead of the projection 21*a* during contents download shown in FIG. 11, projection 21*c* before an instruction to download contents and during contents download shown in FIG. 14 is projected by the image output section 21. The projection 21*c* before contents download instruction and during contents download is based on an image obtained by the contents reproduction section 23, and projected with luminance unchanged.

When the Web page display 15a shown in FIG. 8 is displayed on the display section 15, or when the Web page display 15a shown in FIG. 9 is displayed on the display section 15, in case of the first illustration, display on the image output section 21 is the same as display on the display section 15. Meanwhile, in case of the second illustration, display on the image output section 21 is the projection 21c before contents download instruction and during contents download shown in FIG. 14.

The descriptions of the image to be displayed on the display section 15 and the image to be displayed on the image output section 21 in connection with the illustrations are finished, and the description will be continued for the operation of each section of the terminal.

Figure 15:
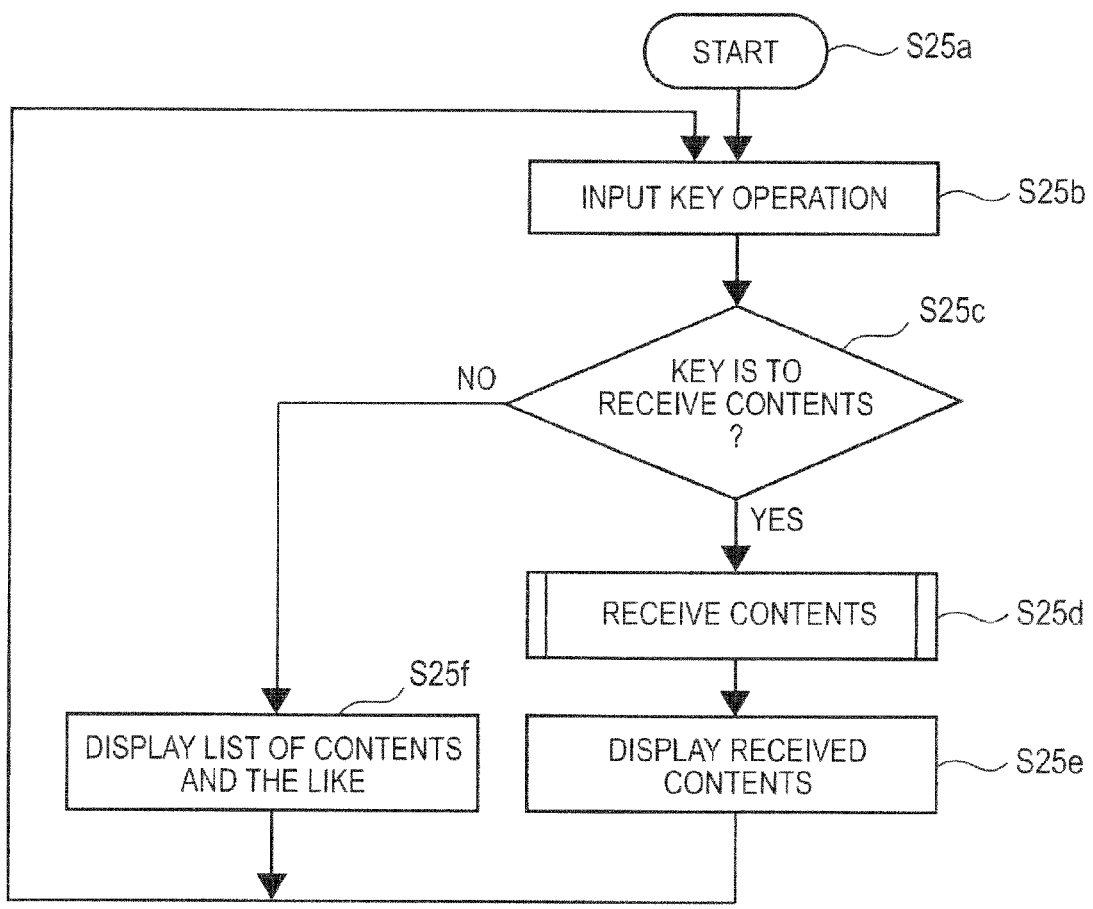
FIG. 15 is an exemplary flowchart illustrating an operation of a contents transfer section to receive contents and display the contents according to an embodiment of the invention.

FIG. 15 is a flowchart illustrating an operation of the contents transfer section 25 to receive contents and control the display section 15 and/or the image output section 21 to display the contents. The contents transfer section 25 starts an operation to receive and display contents while displaying a list of contents stored in the contents server apparatus (Step S25a). A control of the contents transfer section 25 regarding whether display in Step S25a and later is display on the display section 15 or display on the image output section 21 is the same as described in the operation of the browser section 24, and thus a description thereof will be omitted.

If a key operation of the input device 16 is input, the contents transfer section 25 sends the key operation to the contents server apparatus (Step S25b), and determines whether or not the key operation is an instruction to receive contents (Step S25c). Contents reception follows FTP (File Transfer Protocol). For example, if a cursor is moved onto one of a list of contents by an operation of the cross selection key 16b, and then enter key 16a is operated, an instruction to receive contents, on which the cursor is located, to be identified from the list of contents is input. As will be apparent from the FTP, no technical difference exists between contents reception and file reception.

If it is determined in Step S25c that the instruction to receive contents is input, the contents transfer section 25 receives contents transmitted from the contents server apparatus, stores the received contents in the contents storage section 22 as the contents 22a (Step S25d), and controls the contents 22a to be reproduced (Step S25e). Next, the contents transfer section 25 returns to the operation to input a key operation of the input device 16 in Step S25b.

If it is determined in Step S25c that the key operation is not an instruction to receive contents, for example, the key operation is an instruction to display a list of contents, the contents transfer section 25 displays a list of contents transmitted from the contents server apparatus in accordance with the key operation (Step S25f). Next, the contents transfer section 25 returns to the operation to input a key operation of the input device 16 in Step S25b.

The operation of the contents transfer section 25 in Step S25d is the same as the operation of the browser section 24 in Step S24d, which is described with reference to FIG. 6, and a description thereof will be omitted.

In regards to reproduction display of contents 22a in Step S25e, a window to be display is a window that is different from a window allocated to the contents transfer section 25. Reproduction display is performed by the contents reproduction section 23. For this reason, the user's operation is needed after contents are received in Step S25d until reproduction display of the contents is performed in Step S25e. That is, the contents reproduction section 23 may receive a key operation of the input device 16.

During the operation of the contents transfer section 25 to receive contents and display the contents, the communication path is selected by the transmitting/receiving section 13 and not changed until the contents are received, but this is not intended to limit the invention. As described in the operation of the browser section 24, the communication path may be designated by the contents transfer section 25, or it may be changed due to two momentums.

A first momentum is a handover by the transmitting/receiving section 13, and a second momentum is an instruction to change a communication path from the contents transfer section 25 to the transmitting/receiving section 13. The operation of the contents transfer section 25 to instruct a change of a communication path is the same as the operation of the browser section 24 to instruct a change of a communication path, and a description thereof will be omitted.

An image to be displayed on the display section 15 and an image to be projected by the image output section 21 during the operation of the contents transfer section 25 are based on the image to be displayed on the display section 15 and the image to be displayed on the image output section 21 during the operation of the browser section 24, which are described with reference to FIGS. 8 to 14, respectively. A difference is that, instead of the Web page display 15a, contents list display is performed, as described in Step S25f of the flowchart shown in FIG. 15, which illustrates the operation of the contents transfer section 25.

Figure 16:
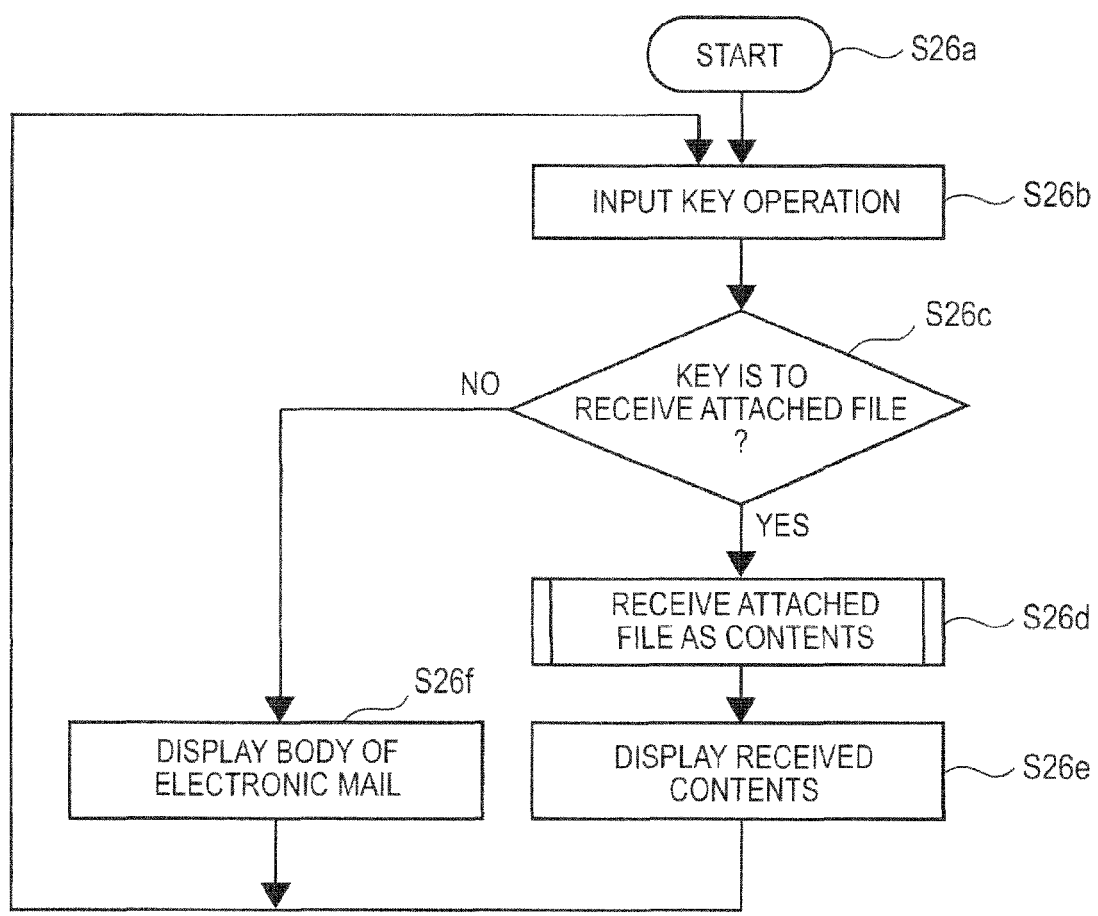
FIG. 16 is an exemplary flowchart illustrating an operation of an electronic mail transmitting/receiving section to receive contents and display contents according to an embodiment of the invention.

FIG. 16 is a flowchart illustrating an operation of the electronic mail transmitting/receiving section 26 to receive contents and control the display section 15 and/or the image output section 21 to display the contents. The electronic mail transmitting/receiving section 26 starts to receive and display contents while displaying the title and body of each electronic mail stored in the mailbox and an attached tile attached to the electronic mail, that is, contents identification information (Step S26a).

A control of the electronic mail transmitting/receiving section 26 regarding whether display in Step S26a and later is display on the display section 15 or display on the image output section 21 is the same as described in the operation of the browser section 24, and thus a description thereof will be omitted.

If a key operation of the input device 16 is input (Step S26b), the electronic mail transmitting/receiving section 26 determines whether or not the key operation is an instruction to receive contents (Step S26c). Contents reception follows IMAP (Internet Message Access Protocol). For example, if a cursor is moved onto contents identification information by an operation of the cross selection key 16b, and the enter key 16a is operated, it is determined that an instruction to receive contents, on which the cursor is located, to be identified by contents identification information is input.

If it is determined that the instruction to download contents is input, the electronic mail transmitting/receiving section 26 downloads contents to be identified by the instruction, stores the downloaded contents in the contents storage section 22 as the contents 22a (Step S26d), and performs reproduction display of the contents 22a (Step S26e). Next, the electronic mail transmitting/receiving section 26 returns to the operation to input a button operation in Step S26b.

If it is determined in Step S26c that the button is not a button that instructs to download contents, the button is a button that is used to display an undisplayed portion of the body of the electronic mail being displayed. Then, the electronic mail transmitting/receiving section 26 displays the body in accordance with the instruction (Step S26*f*). Next, the electronic mail transmitting/receiving section 26 returns to the operation to input a key operation of the input device 16 in Step S26*b*.

The operation of the electronic mail transmitting/receiving section 26 in Step S26*d* is the same as the operation of the browser section 24 in Step S24*d*, which is described with reference to FIG. 6, and a description thereof will be omitted.

In regards to reproduction display of the contents 22*a* in Step S26*e*, a window to be displayed may be a part of a window allocated to the electronic mail transmitting/receiving section 26 or the entire window, or a different window. Reproduction display may be performed by the contents reproduction section 23 or the electronic mail transmitting/receiving section 26. In addition, downloaded contents may be stored in the electronic mail transmitting/receiving section 26, not the contents storage section 22.

During the operation of the electronic mail transmitting/receiving section 26 to receive contents and display the contents, the communication path is selected by the transmitting/receiving section 13 and not changed until the contents are received, but this is not intended to limit the invention. As described in the operation of the browser section 24, the communication path may be designated by the electronic mail transmitting/receiving section 26, or the communication path may be changed due to two momentums.

A first momentum is a handover by the transmitting/receiving section 13, and a second momentum is an instruction to change a communication path from the electronic mail transmitting/receiving section 26 to the transmitting/receiving section 13. The operation of the electronic mail transmitting/receiving section 26 to instruct a change of a communication path is the same as the operation of the browser section 24 to instruct a change of a communication path, and thus a description will be omitted.

An image to be displayed on the display section 15 and an image to be display on the image output section 21 during the operation of the electronic mail transmitting/receiving section 26 are based on the image to be displayed on the display section 15 and the image to be displayed on the image output section 21 during the operation of the browser section 24, which are described with reference to FIGS. 8 to 14, respectively. A difference is that, instead of the Web page display 15*a*, electronic mail body display is performed, as described in Step S26*f* of the flowchart shown in FIG. 16, which illustrates the operation of the electronic mail transmitting/receiving section 26.

In the foregoing description, the local area wireless communication section 12*e* performs communication by the wireless LAN system, but this is not intended to limit the invention. Instead of or in addition to communication by the wireless LAN system, communication by a Bluetooth (Registered Trademark) system may be performed.

As for communication by this system, contents reception follows OBEX (Object Exchange Protocol). In addition, communication by this system may be performed with respect to a Bluetooth® access point (not shown) or may be performed with respect to a terminal (not shown) of a contact.

Communication by the Bluetooth® system has low power consumption, as compared with communication through each bearer of the mobile communication network communication section 12*b*. The communication speed depends on the Bluetooth® system, but fast communication is not necessarily performed. For this reason, when a distance from the Bluetooth® access point or the contact's terminal is changed, or when it is determined that faster communication can be performed, the transmitting/receiving section 13 performs a handover.

To perform fast communication, the browser section 24, the contents transfer section 25, and the electronic mail transmitting/receiving section 26 perform a handover between each bearer of the mobile communication network communication section 12*b* and the Bluetooth® system. The handover is the same as the handover described with reference to FIG. 7, excluding that a communication speed of communication by the Bluetooth® system is predicted by the operation to predict a communication speed in Step S24*t*, and a search including communication by the Bluetooth® system is executed by the operation to fast search a bearer in Step S24*v*, and thus a description thereof will be omitted. As describe above, the handover may not be performed by this operation.

In the foregoing description, the local area wireless communication section 12*e* performs communication by the wireless LAN system, but this is not intended to limit the invention. Instead of or in addition to the wireless LAN system, communication by the IrDA (Infrared Data Association) system using an infrared ray may be performed.

When communication is performed through an infrared ray, the terminal includes a light emitting section that emits an infrared ray, and a light receiving section that receives the infrared ray. As for communication by this system, contents reception follows OBEX (Object Exchange Protocol). In addition, communication by this system may be performed with respect to an infrared communication access point (not shown) or may be performed with respect to a terminal of a contact.

Communication by the IrDA system using an infrared ray has low power consumption, as compared with communication by each bearer of the mobile communication network communication section 12*b*. The communication speed depends on the IrDA system, but fast communication is not necessarily performed. For this reason, when a distance from the infrared communication access point or the contact's terminal is changed, or when it is determined that faster communication can be performed, the transmitting/receiving section 13 performs a handover.

To perform fast communication, the browser section 24, the contents transfer section 25, and the electronic mail transmitting/receiving section 26 perform a handover between each bearer of the mobile communication network communication section 12*b* and the IrDA system through an infrared ray. The handover is the same as the handover described with reference to FIG. 7, excluding that a communication speed of communication by the IrDA system is predicted by the operation to predict a communication speed in Step S24*t*, and a search including communication by the IrDA system is executed by the operation to fast search a bearer in Step S24*v*, and thus a description thereof will be omitted. As describe above, the handover may not be performed by this operation.

In the foregoing description, when the transmitting/receiving section 13 performs a handover, it is not determined whether or not a communication path after the handover meets the limitations of current consumption and power consumption, and the browser section 24, the contents transfer section 25, and the electronic mail transmitting/receiving section 26 determine whether or not the communication path meets the limitations. However, the invention is not limited thereto. The transmitting/receiving section 13 may determine whether or not the communication path meets the limitations.

The transmitting/receiving section 13 may perform the handover shown in FIG. 7. In this case, the browser section 24, the contents transfer section 25, and the electronic mail transmitting/receiving section 26 receive a communication speed of a communication path from the transmitting/receiving section 13, and predicts the time required to download contents on the basis of the received communication speed.

In the foregoing description, the communication speed is predicted after a part of contents is received, but this is not intended to limit the invention. For example, before contents are received, for each bearer of the mobile communication network communication section 12b, a fastest communication speed based on the specification of the local area wireless communication section 12e may be predicted.

In addition, before contents are received, an error rate of communication using the mobile communication network communication section 12b may be estimated on the basis of the intensity or quality of an electric wave received by the mobile communication network communication section 12b or a signal to noise ratio, and an error rate of communication using the local area wireless communication section 12e may be estimated on the basis of the intensity or quality of an electric wave received by the local area wireless communication section 12e or a signal to noise ratio. Prediction of a communication speed on the basis of the estimated communication error rate is as described above. The communication speed, instead of the error rate, may be estimated on the basis of the intensity or quality of an electric wave.

In the foregoing description, the image output section 21 is a projector that projects an image outside of the apparatus, but the invention is not limited thereto. A processing section, may be used, which transmits image signals and control signals for instructing power supply and shutoff, and luminance change to a display, which displays image outside the apparatus, for example, a television receiver.

In the foregoing description, the mobile communication terminal having the display section 15 and the image output section 21 has been described, but the invention can be applied to other apparatuses. For example, the invention may be applied to a contents receiving apparatus having no display section 15. In addition, the invention may be applied to a contents receiving apparatus having no image output section 21. The invention is not limited to the above-described embodiment, but various changes and modifications may be made without departing from the scope of the invention.

As described with reference to the above embodiment, there is provided a contents receiving apparatus that is capable of reducing power consumption and performing display such that a person who views display does not feel a sense of discomfort.

According to the embodiment, it is possible to reduce power consumption and perform display such that a person who views display does not feel a sense of discomfort.

What is claimed is:

1. A content receiving apparatus comprising:
a communication unit configured to receive content data;
a display unit configured to display an image included in the content data; and
a controller configured to instruct the communication unit to receive content data, and to control the display unit to display the image,
wherein, when estimated time of completion for receiving the content data is longer than a given time, the controller controls the display unit to change a luminance level of the display unit from a first luminance level to a second luminance level that is lower than the first luminance level or not to display the content data, and
wherein, when the estimated time is equal to or shorter than the given time, the controller controls the display unit to maintain the luminance level at the first luminance level.

2. The apparatus according to claim 1,
wherein, when the communication unit receives the contents data, the controller controls the display unit to display an image indicating that the communication unit is receiving the content data.

3. The apparatus according to claim 1,
wherein, when a part of the content data is received by the communication unit, the controller calculate a reception speed from a data size of the part of the content data and a time required to receive the part of the content data, and
wherein the controller predicts a time required to receive the content data based on the reception speed and size of the content data.

4. The apparatus according to claim 3,
wherein, when the content data is reproduced by streaming, the estimated time is a time for receiving a certain amount of the content data to start streaming.

5. The apparatus according to claim 3, further comprising:
a storage unit that stores a plurality of communication rates associated with error rates on a communication path and communication methods on the communication path,
wherein the communication unit receives the content data by one of the communication methods, and
wherein, when the communication unit receives a part of the content data by the one of the transmission methods, the controller configured:
to calculate the reception speed of the one of the communication method,
to acquire one of the error rates stored in the storage unit corresponding to the reception speed,
to acquire reception speeds corresponding to communication methods,
to calculate the time required to receive the content data in the respective communication method from the reception speeds and the size of the content data,
to select one of the communication methods based on the calculated times, and
to instruct the communication unit to receive the contents by the selected communication method.

6. The apparatus according to claim 5,
wherein the controller selects a communication method in which the predicted time required to receive is shortest.

7. The apparatus according to claim 5,
wherein the controller selects a communication method in which power consumption of the communication unit to receive the content data is lowest.

8. The apparatus according claim 1,
wherein the communication unit is configured to receive the content data via one of a plurality of communication paths,
wherein the controller selects one of the communication paths in which a current required by the communication unit has a current value equal to or less than a given current value, and instructs the communication unit to receive the content data via the selected communication path.

9. A content receiving apparatus comprising:
a communication unit configured to receive content data;
a projector configured to project an image included in the content data; and
a controller configured to instruct the communication unit to receive content data, and to control the projector to project the image,
wherein, when estimated time of completion for receiving the content data is longer than a given time, the controller controls the projector to change a luminance level of the image from a first luminance level to a second luminance level that is lower than the first luminance level or not to output the image, and wherein, when the estimated time is equal to or shorter than the given time, the controller controls the projector to maintain the luminance level at the first luminance level.

10. The apparatus according to claim 9,
wherein, when the communication unit receives the content data, the controller controls the projector to project an image indicating that the communication unit is receiving the content data.

11. A content receiving apparatus comprising:
a communication unit configured to receive content data;
a display unit configured to display an image included in the content data;
an image output unit configured to output the image; and
a controller configured to instruct the communication unit to receive content data, to control the image output unit to output the image, and to control the display unit to display the image,
wherein, when estimated time of completion for receiving the content data is longer than a given time, the controller controls the image output unit to change a luminance level of the image from a first luminance level to a second luminance level that is lower than the first luminance level or not to output the image, and controls the display unit to display the image, and
wherein, when the estimated time is equal to or shorter than the given time, the controller controls the image output unit to maintain the luminance level at the first luminance level, and controls the display unit to display the image.

12. The apparatus according to claim 11,
wherein, when the communication unit receives the content data, the controller controls the image output unit to output a notification image indicating that the communication unit is receiving the content data, and controls the display unit to display the notification image.

13. The apparatus according to claim 11,
wherein, when the estimated time is longer than the given time while a mode of the controller allows the display unit to display the image and allows the image output unit to output the same image, the controller controls the image output unit to change the luminance level of the image from the first luminance level to the second luminance level or not to output the image, and controls the display unit to display the image, and
wherein, when the estimated time is longer than the given time while the mode of the controller allows the display unit to display the image and allows the image output unit to output a different image that is different from the image, the controller controls the image output unit to maintain the luminance level at the first luminance level and controls the display unit not to display the image, or controls the display unit to display the image.

14. The apparatus according to claim 13,
wherein, when the communication unit receives the content data, the controller controls the display unit to display a notification image indicating that the communication unit is receiving the content data.

15. The apparatus according to claim 11,
wherein a screen of the display unit is provided in a main body, and the image output unit is a projector.

* * * * *